US012777368B2

(12) United States Patent
Vaez-Ghaemi et al.

(10) Patent No.: US 12,777,368 B2
(45) Date of Patent: Oct. 27, 2026

(54) O-RAN FRONTHAUL ANALYZER WITH INTEGRATED IMPAIRMENT GENERATOR

(71) Applicant: VIAVI SOLUTIONS INC., Chandler, AZ (US)

(72) Inventors: Reza Vaez-Ghaemi, Potomac, MD (US); Wei Chen, Potomac, MD (US); Kenneth Trudgeon, Victoria (CA); David Fenstermacher, Mount Airy, MD (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 341 days.

(21) Appl. No.: 18/475,149

(22) Filed: Sep. 26, 2023

(65) Prior Publication Data

US 2025/0106683 A1 Mar. 27, 2025

(51) Int. Cl.

*H04W 28/02* (2009.01)
*H04W 24/08* (2009.01)
*H04W 88/08* (2009.01)

(52) U.S. Cl.

CPC ....... *H04W 28/0289* (2013.01); *H04W 24/08* (2013.01); *H04W 88/085* (2013.01)

(58) Field of Classification Search

CPC .. H04W 28/0289; H04W 24/08; H04W 88/05
See application file for complete search history.

(56) References Cited

U.S. PATENT DOCUMENTS

2024/0381129 A1* 11/2024 Uniyal ................ H04L 43/0817
2025/0150866 A1* 5/2025 Lins de Medeiros ....................... H04L 43/0829

OTHER PUBLICATIONS 2023 5G Challenge Stage Two—RU Test Plan, Mar. 21, 2023, Version: 1.3, CableLabs, 46 pages.
5G; NR; Physical channels and modulation (3GPP TS 38.211 version 15.4.0 Release 15); ETSI TS 138 211 V15.4.0 Apr. 2019, 98 pages.
Abdalla, et al.; Toward Next Generation Open Radio Access Networks—What O-RAN Can and Cannot Do!; IEEE Network Magazine; Mar. 26, 2022; 8 pages.
Accuver, AEGIS-O, O-RAN End-to-End Test & Measurement Platform, 1 page, downloaded from the Internet on Sep. 26, 2023. (https://www.accuver.com/sub/products/view.php?idx=45).

(Continued)

*Primary Examiner* — Asad M Nawaz
*Assistant Examiner* — Najeeb Ansari
(74) *Attorney, Agent, or Firm* — Mannava & Kang, P.C.

(57) ABSTRACT

According to examples, an O-RAN FHA may include a packet analyzer including hardware, an impairment generator, and a Parser to receive packet traffic flows outputted by an O-DU) and/or an O-RU. The Parser may parse packets in the received packet traffic flows, determine which of the received packet traffic flows are to receive impairments, and set action bits for the packets in the packet traffic flows that are to receive impairments, in which the action bits denote information indicating types of impairments to be applied to certain ones of the packet traffic flows. The Parser may also output the packet traffic flows with the action bits set for the packets to the packet analyzer and the impairment generator, in which the impairment generator is to generate impairments on the packet traffic flows based on settings of the action bits for the packets in the packet traffic flows.

16 Claims, 7 Drawing Sheets

(56) References Cited

OTHER PUBLICATIONS

ECPRI Specification V2.0, Common Public Radio Interface: eCPRI Interface Specification, May 10, 2015, 109 pages.
O-RAN Alliance Working Group 5 O1 Interface specification for O-DU; O-RAN.WG5.O-DU-O1.0-R003-v07.00; Jun. 2023, 143 pages.
O-RAN Fronthaul Working Group Fronthaul Interoperability Test Specification (IOT); O-RAN.WG4.IOT.0-R003-v10.00; Oct. 2022, 128 pages.
O-RAN Intel® FPGA IP Design Example User Guide; Updated for Intel® Quartus® Prime Design Suite: 23.1; IP Version: 1.9.1; Aug. 15, 2023; pp. 32.
O-RAN Intel® FPGA IP User Guide; Updated for Intel® Quartus® Prime Design Suite: 23.1; IP Version: 1.9.1; Aug. 15, 2023; 54 pages.
O-RAN Open Xhaul Transport WG9 WDM-based Fronthaul Transport; O-RAN.WG9.WDM.0-R003-v03.00; Mar. 2023, 60 pages.
O-RAN Test and Integration Focus Group End-to-end Test Specification; O-RAN.TIFG.E2E-Test.0-v04.00; Oct. 2022, 227 pages.
O-RAN Work Group 1 (Use Cases and Overall Architecture) Use Cases Detailed Specification; O-RAN.WG1.Use-Cases-Detailed-Specification-R003-v11.00; Jun. 2023, 189 pages.
O-RAN Working Group 1 (Use Cases and Overall Architecture) O-RAN Architecture Description; O-RAN.WG1.OAD-R003-v09.00; Jun. 2023, 41 pages.
O-RAN Working Group 4 (Open Fronthaul Interfaces WG) Control, User and Synchronization Plane Specification; O-RAN.WG4.CUS.0-R003-v12.00; Jun. 2023, 395 pages.
O-RAN Working Group 4 (Open Fronthaul Interfaces WG) Management Plane Specification; O-RAN.WG4.MP.0-R003-v12.00; Jun. 2023, 283 pages.
Polese, et al.; Understanding O-RAN: Architecture, Interfaces, Algorithms, Security, and Research Challenges; Aug. 1, 2022; 33 pages.
Publicly Available Specification (PAS); O-RAN Fronthaul Control, User and Synchronization Plane Specification v07.02; (O-RAN-WG4.CUS.0-v07.02); ETSI TS 103 859 V7.0.2; Sep. 2022; 318 pages.
The Evolution of Open Ran; A 5G Americas White Paper; Feb. 2023; 50 pages.
Umesh, et al.; Overview of O-RAN Fronthaul Specifications; NTT Docomo Technical Journal vol. 21 No. 1; Jul. 2019; 14 pages.
Viavi Solutions; Open Fronthaul Test Applications with T-BERD/MTS-5800; Sep. 2021, 5 pages.
Viavi Solutions; Test Suite for O-RAN Specifications; Updated for 2021 to include learnings from 2020 plugfest; 2021, 14 pages.
Xena, “Test the Resiliency of your 5G RAN Fronthaul Solution”; GSMA | The Mobile Economy—The Mobile Economy; Mar. 2023, 4 pages.

* cited by examiner

O-RAN FRONTHAUL ANALYZER WITH INTEGRATED IMPAIRMENT GENERATOR

TECHNICAL FIELD

This patent application is directed to a fronthaul analyzer, and more specifically, to an analyzer of packet traffic flow on an Open Radio Access Network (O-RAN) fronthaul link between an O-RAN-Distributed Unit (O-DU) and an O-RAN-Radio Unit (O-RU), in which the fronthaul analyzer includes an integrated impairment generator that may generate impairments on packet traffic flows to mimic real world O-RAN transmission scenarios.

BACKGROUND

Presently, cellular telephony technology is developing and adopting the Open Radio Access Network (O-RAN) standards, which may provide interoperability that may enable multiple cellular network/communication protocols/types and the products of multiple vendors to work together in the same network. O-RAN standards focus on openness (open source software, hardware interoperability/open interfaces, flexible deployment in a disaggregated multi-vendor/multi-tech architecture), intelligence (incorporating artificial intelligence (AI) into the deployment, operation, and maintenance of the network and using software-defined implementations of wireless communications and networking functions), and virtualization (in order to decouple legacy entities and layers, thereby enabling the interoperability, flexibility, disaggregation, and heterogeneity of the O-RAN environment).

BRIEF DESCRIPTION OF DRAWINGS

Features of the present disclosure are illustrated by way of example and not limited in the following Figure(s), in which like numerals indicate like elements, in which.

DETAILED DESCRIPTION

Figure 1:
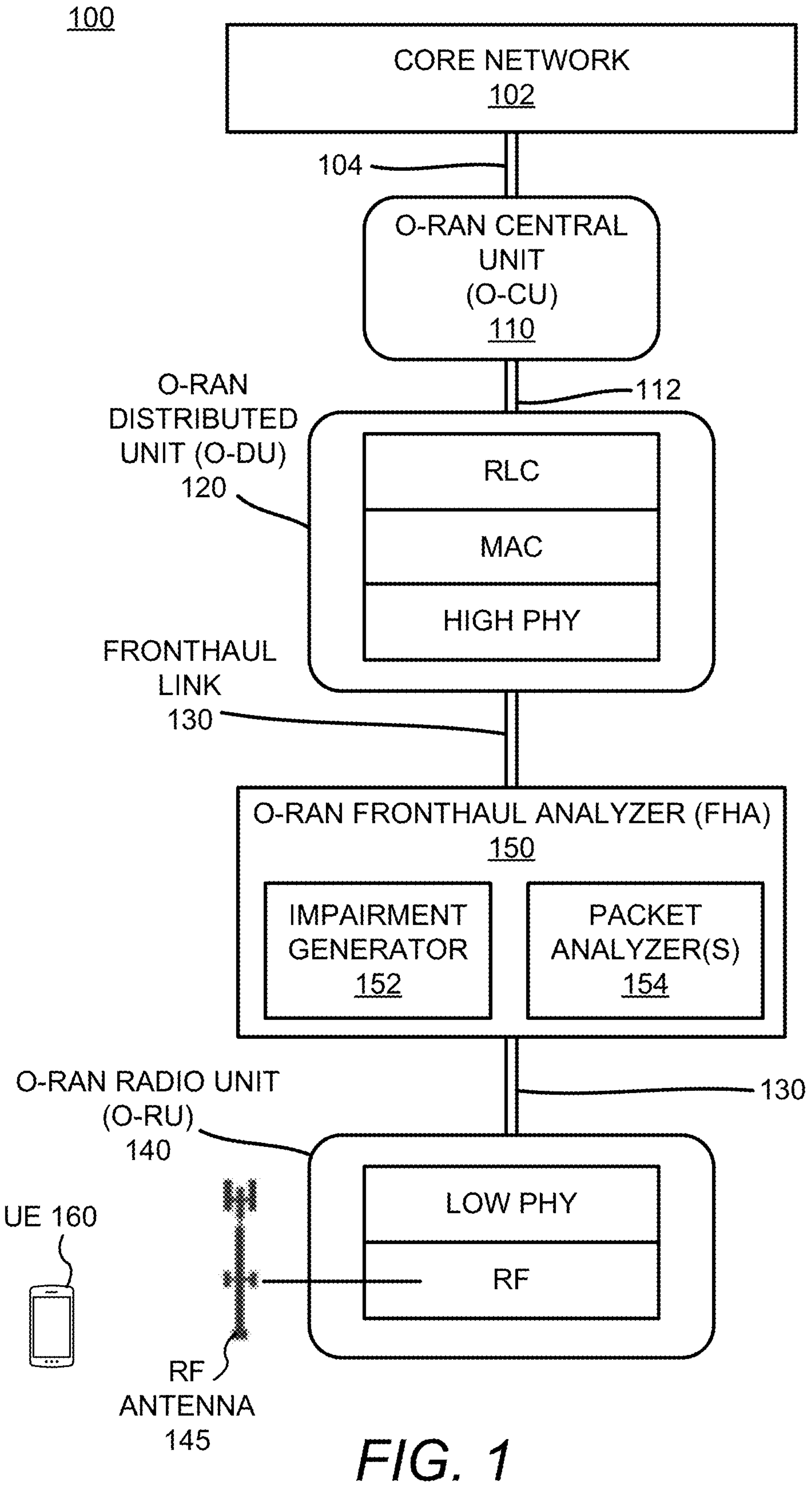
FIG. 1 is a block diagram illustrating relevant units/components of an Open Radio Access Network (O-RAN) fronthaul (FH) link that a real-time O-RAN Fronthaul Analyzer (FHA) having an integrated impairment generator and one or more packet analyzers may test/analyze, according to an example.

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Analyzers/testers may be used to test, analyze, and evaluate both the hardware and the software of the components operating in a cellular communication network that implements the O-RAN standards. In examples of the present disclosure, a real-time O-RAN fronthaul (FH) analyzer (FHA) provides real-time hardware analysis, processing, and measurement and/or real-time continuous generation of analysis, measurements, statistics, etc., of an O-RAN FH link between at least one O-RAN Distributed Unit (O-DU) and at least one O-RAN Radio Unit (O-RU). As used herein in reference to an O-RAN FHA according to examples of the present disclosure, the terms "real-time" or "in real time" refer to an O-RAN FHA according to examples of the present disclosure performing the processing, functions, and/or actions within roughly a nanosecond of receipt at the O-RAN FHA of the frame and/or packet upon which the processing, functions, and/or actions performed, e.g., from about 0.5 nanosecond to about 1.5 milliseconds after receipt.

Some advantages and benefits of the systems and methods for a real-time O-RAN FHA according to examples of the present disclosure are described, while other benefits and advantages may also be apparent to anyone of ordinary skill in the art. For instance, a real-time O-RAN FHA according to examples of the present disclosure may provide real-time analysis, processing, and measurement of the O-RAN fronthaul link in hardware, rather than (and/or in addition to) post-processing in software of captured packets/frames from the O-RAN fronthaul link. Accordingly, a user may perform "live" analysis in real-time on a running O-RAN fronthaul link.

The O-RAN FHA disclosed herein may include an integrated impairment generator to selectively generate impairments on packet traffic that flow through the O-RAN FHA. Particularly, the impairment generator may generate impairments to emulate impairments that may occur during real world transmission scenarios on an O-RAN fronthaul link. In other words, the O-RAN FHA disclosed herein may include an impairment generator that selectively generates impairments on the packet traffic flow between an O-DU and an O-RU or between multiple O-DUs and multiple O-RUs.

As discussed herein, the O-RAN FHA may include a Parser that may parse packets in packet traffic flows received from an O-DU and/or an O-RU and may determine types of packets in the received packet traffic flows. The Parser may also output the parsed packets to a hardware packet analyzer and the impairment generator. The Parser may set action bits for the packets in the packet traffic flows that are to receive impairments and the impairment generator may generate impairments on the packets in the packet traffic flows based on the action bits. The impairments may include at least one of a packet traffic flow latency modification, one or more dropped packets in the packet traffic flow, a modification to an order of the packets in the packet traffic flow, and/or the like.

Through implementation of features of the present disclosure, an O-RAN FHA may include both an impairment generator that may generate impairments in packet traffic flows and a packet analyzer that may analyze packets. In one regard, a separate impairment generator may not be employed during the testing of an O-RAN fronthaul link, which may reduce the number of components employed in the testing process. In another regard, the integration of the impairment generator into the O-RAN FHA may enable fine-grained testing of the O-RAN fronthaul link. Particularly, for instance, the features of the present disclosure may enable testing of specific types of packet flows, e.g., C-plane packet flows, U-Plane packet flows, S-Plane packet flows, and M-plane packet flows. As a result, a technical improvement afforded through implementation of features of the present disclosure may be that the accuracy of O-RAN fronthaul links may be improved, which may result in more efficient and accurate testing.

In examples of a real-time O-RAN FHA according to the present disclosure, packet analysis may be performed/implemented in parallel in hardware, rather than serially in post-processing by software reading and accessing captured frames/packets. Accordingly, packet analysis may be faster. In examples of a real-time O-RAN FHA according to the present disclosure, low level analysis of packet traffic flow over the O-RAN fronthaul link may be performed/implemented in hardware for continuous real-time processing, rather than (and/or in addition to) being performed by after-the-fact post-processing in software of captured packets/frames from the O-RAN fronthaul link. Accordingly, when a user performs live analysis in real-time on a running O-RAN fronthaul link, the live analysis may be continuously generated and/or updated in real-time as environmental/system changes occur.

FIG. 1 is a block diagram illustrating relevant units/components of an Open Radio Access Network (O-RAN) fronthaul (FH) link that may be tested/analyzed by a real-time O-RAN Fronthaul Analyzer (FHA) 150 having an integrated impairment generator 152 and one or more packet analyzers 154, according to an example. Only the units/components of an O-RAN 100 most relevant to the explanation and description of a real-time O-RAN fronthaul analyzer 150 according to the examples of the present disclosure are shown and discussed herein. Moreover, less relevant components/units shown and described may not be numbered.

In FIG. 1, a core network 102 is connected by a backhaul link 104 to an O-RAN Central Unit (O-CU) 110, which, in turn, is connected by a midhaul link 112 to an O-RAN Distributed Unit (O-DU) 120, which, in turn, is connected by an O-RAN fronthaul (FH) link 130 to an O-RAN Radio Unit (O-RU) 140, which may include an RF antenna 145. A user equipment (UE) 160 communicates via radio interface with the RF antenna 145 of the O-RU 140.

In the design of the O-RAN architecture, which is in harmony with the 5G New Radio (NR) RAN architecture defined by the 3GPP, the O-CU 110, the O-DU 120, and the O-RU 140 may be responsible for delivering the diverse functions of the radio protocol stack associated with the Radio Resource Control (RRC), Service Data Adaption Protocol (SDAP), Packet Data Convergence Protocol (PDCP), Radio Link Protocol (RLC), and the Ethernet Medium Access Control (MAC) and physical (PHY) layers.

The O-RU 140 may integrate antenna elements with radio processing components, such as transceivers, analog beamformers, and power amplifiers, by which the O-RU 140 may use its RF antenna 145 to establish a PHY layer connection with the UE 160. In addition to the RF processing, the O-RU 140 integrates the lower level PHY layer processing (Low PHY), such as digital and/or analog beamforming, the fast Fourier transform (FFT)/inverse-FFT (i-FFT) processing, Cyclic Prefix (CP) addition, Digital-Analog Conversion, IQ Compression/Decompression, etc. The O-RU 140 communicates with the O-DU 120 over the O-RAN FH link 130.

As would be understood by one of ordinary skill in the art, although labelled a "link" herein, the O-RAN FH link 130 may take any number of forms, including a network or a cloud. Moreover, the O-RAN FH link 130 may use Ethernet as a transport mechanism (i.e., the Institute of Electrical and Electronic Engineers (IEEE) Standard 802.3 (IEEE 802.3)), as it does in the present disclosure, but the O-RAN FH link 130 may also use the Internet Protocol (IP), the Internet Engineering Task Force (IETF) Request for Comments (RFCs) 791 & 2460, and the User Datagram Protocol (UDP), IETF RFC 768, in addition to Ethernet, or in place thereof. When using Ethernet, the payload of the Ethernet frame may contain a further transport header and payload, which encapsulation may be indicated in the EtherType field of the Ethernet frame header. O-RAN allows for multiple different headers within the Ethernet payload to further describe how the data may be handled, including the evolved Common Public Radio Interface (eCPRI) transport header. For further details, see, e.g., Sect. 5 of the Control, User, and Synchronization Plane Specification of O-RAN Working Group 4 (O-RAN.WG4.CUS.0-R003-v12.00), which is hereby incorporated by reference herein in its entirety (hereinafter referred to as "the O-RAN FH C/U/S-Plane standard").

As would be understood by one of ordinary skill in the art, although FIG. 1 shows a single O-DU connected to a single O-RU, a single O-DU may be connected to multiple O-RUs (either in parallel or in cascade mode), or multiple O-DUs may be connected to multiple O-RUs. See, e.g., Sect. 2.1.1 of the Fronthaul Interoperability Test Specification of O-RAN Working Group 4 (O-RAN.WG4.IOT.0-R003-v10.00), which is hereby incorporated by reference herein in its entirety (hereinafter referred to as "the O-RAN FH IOT standard"). Moreover, the O-RAN FH link 130 may include a Fronthaul Transport Network node (FTN) or Transport Network Element (TNE), which may be used to manage the Ethernet communications between one or more O-DUs and one or more O-RUs, a Fronthaul Multiplexer (FHM), whereby a single O-DU may connect with a cell having multiple O-RUs, or with multiple cells, each having multiple O-RUs, or a Fronthaul Gateway (FHGW or FHG), whereby one or more O-DUs may connect with a non-O-RAN RU (such as, e.g., a Remote Radio Unit (RRU), a Remote Radio Head (RRH), etc.). See, e.g., Annex A of the O-RAN Architecture Description of O-RAN Working Group 1 (O-RAN.WG1.OAD.R003-v09.00), which is hereby incorporated by reference herein in its entirety.

Referring to FIG. 1, the O-DU 120 is connected to the O-RU 140 via the O-RAN FH link 130, and may be responsible for the higher level processing functions of the PHY layer (High Phy), such as, e.g., channel modulation and coding/decoding, the Ethernet MAC layer, and the RLC layer. The O-DU 120 is connected via the midhaul link 112 to the O-CU 110, which may be responsible for the upper layers of the radio protocol: the RRC, the PDCP, and the SDAP. The O-CU 110 may be supported by the Network Function Virtualization Infrastructure (NFVI) of the core network, which may enable simultaneous operation with both Long-Term Evolution (LTE) O-DUs and 5G NR O-DUs.

As shown in FIG. 1, the real-time O-RAN Fronthaul Analyzer (FHA) 150 may be detachably or permanently connected to the O-RAN FH link 130 through an in-line connection. For instance, both the transmit (Tx) and receive (Rx) optical fibers from the O-DU 120 and the Tx and Rx optical fibers from the O-RU 140 may be connected separately to two SFP/QSFPs on the real-time FHA 150. In addition, the real-time FHA 150 may operate in an intrusive mode, where all of the communication traffic on the O-RAN FH link 130 flows through some or all of the analytical components of the real-time FHA 150. In some examples, the real-time FHA 150 may operate in a non-intrusive mode, where the real-time FHA 150 makes copies of traffic packets to analyze in real time, and the real-time FHA 150 may either be connected to the O-RAN FH link 130 by a tap or equivalent interconnection, or the real-time FHA 150 allows some or all of the traffic to flow through a direct channel in the real-time FHA 150. The real-time FHA 150 may operate in the non-intrusive mode in instances in which the impairment generator 152 is not implemented but the packet analyzer(s) 154 is implemented. In some examples, the real-time O-RAN FHA 150 may provide bidirectional Synchronous Ethernet (SyncE) clock recovery, which may avoid any break/interrupt of the SyncE line frequency from, e.g., the O-DU 120 to the O-RU 140 (in network configuration LLS-C1), which may be beneficial when in either intrusive mode.

As also shown in FIG. 1, the real-time FHA 150 may include an impairment generator 152 and one or more packet analyzer(s) 154. The packet analyzer(s) 154, which may each be hardware components, may analyze, evaluate, and/or otherwise synthesize/process the packet traffic flow received in the real-time FHA 150. Details pertaining to how the packet analyzer(s) 154 may operate on the packet traffic flow are discussed in greater detail with reference to FIGS. 2A and 2B. As used herein, "packet traffic flow" may include any packets and/or frames transmitted and/or received over an O-RAN fronthaul link 130, as defined by the O-RAN standards.

According to examples, the impairment generator 152 may emulate packet impairments in the packet traffic flow transmitted and/or received over an O-RAN fronthaul link 130. In other words, the impairment generator 152 may model real world transmission scenarios such as fixed latency, Packet Delay Variation (PDV), jitter, etc., into packets in the packet traffic flows. The impairments may include at least one of a packet traffic flow latency modification, one or more dropped packets in the packet traffic flow, a modification to an order of the packets in the packet traffic flow, and/or the like. Thus, for instance, and as discussed in greater detail herein below, the impairment generator 152 may receive packets in the packet traffic flow between the O-DU 120 and the O-RU 140 and may generate impairments on packets in selected packet traffic flows.

The determination as to which of the packet traffic flows are to receive impairments may be dependent upon the types of the packets in the packet traffic flow, the directions in which the packets are flowing (from the O-DU 120 to the O-RU 140 or from the O-RU 140 to the O-DU 120), etc. In addition, a user may control the types of the packets that are to receive the impairments via a software interface and the impairment generator 152 may operate through software as discussed in greater detail herein.

The user may make the selection through a software interface (not shown), e.g., a graphical user interface, on which packet traffic flow information may be presented to the user. The user may also select/input the type of impairment, e.g., a packet delay to be applied to the packets in a packet traffic flow, and the magnitude of the impairment, e.g., the length of the packet delay to be applied to the packet traffic flow. The selection may be coded into a ternary content-addressable memory (TCAM) by software and a Parser (or a Programming Protocol-independent Packet Processor (P4) that may include a Parser) may set an action bit for the particular packet as enabled. For instance, the software may code values corresponding to the packet and the impairment to be applied into the impairment generator 152. Once the impairment generator 152 receives this packet along with the enabled action bit, the impairment generator 152 may insert the impairment, e.g., delay or drop the packet, based on the selected actions. In some examples, the user may select a number of simultaneous flows and impairments that may be generated and applied on the flows.

Figure 2A:
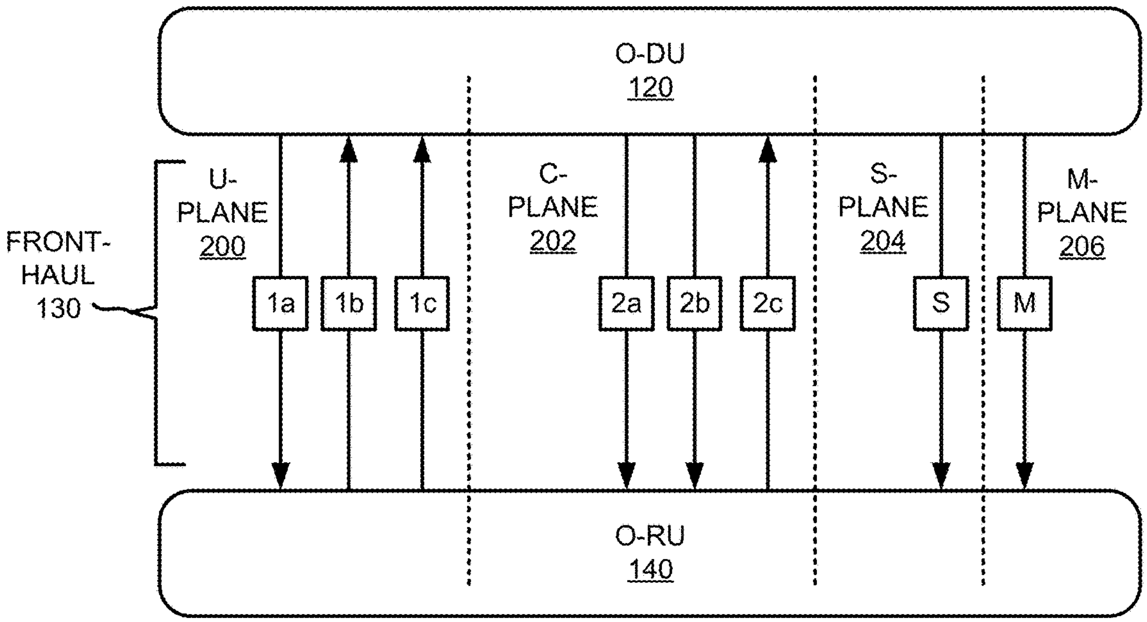
FIG. 2A is a block diagram illustrating the U-Plane, C-Plane, S-Plane, and M-Plane communications between the O-DU and O-RU that a real-time Fronthaul Analyzer may test/analyze, according to an example.

FIG. 2A is a block diagram illustrating the U-Plane 200, C-Plane 202, S-Plane 204, and M-Plane 206 communications between the O-DU 120 and O-RU 140 that a real-time Fronthaul Analyzer 150 may test/analyze, according to an example. The User Plane (U-Plane) 200 may carry real-time uplink and downlink I/Q data transferred over eCPRI (evolved Common Public Radio Interface), while the Control Plane (C-Plane) 202 may carry real-time control information to the O-RU 140 over eCPRI to define how the U-Plane 200 traffic should be handled. See, e.g., the O-RAN FH C/U/S-Plane standard. Because of this, some C-Plane 202 packets should arrive before U-Plane 200 packets and, in the O-RAN standard, these timing tolerances may be relatively tight. See, e.g., the O-RAN FH C/U/S-Plane standard. The O-RAN fronthaul C-Plane 202 is separate and distinct from the C-Plane related to UE over-the-air communications and is governed by entirely different and far more stringent requirements, such as, e.g., strict timing parameters and windows for reception and transmission. See, e.g., the O-RAN FH C/U/S-Plane standard. Because of the interconnectedness of the C-Plane 202 and the U-Plane 200, they may be referred to jointly as the "C/U-Plane" or "C/U Plane" and may be considered as a single communication plane including two interconnected planes.

The Synchronization Plane (S-Plane) 204 and the Management Plane (M-Plane) 206 are so-called "slow protocols," carrying less packet traffic than the C/U-Plane. The S-Plane 204 periodically sends timing and synchronization messages using the Precision Timing Protocol (PTP) to synchronize the O-RU 140 to the rest of the network. See, e.g., the O-RAN FH C/U/S-Plane standard; and PTP (IEEE 1588), which is hereby incorporated by reference in its entirety. The M-Plane 206 contains non-real-time traffic (which, as such, has no especially strict timing parameters), carrying non-real-time management and configuration Network Configuration Protocol (NETCONF) and Yet Another Generation (YANG) (NETCONF/YANG)-based operations. See, e.g., Management Plane Specification of O-RAN Working Group 4 (O-RAN.WG4.MP.0-R003-v12.00), which is hereby incorporated by reference herein in its entirety (hereinafter referred to as "the O-RAN FH M-Plane standard"); IETF RFC 5277, IETF RFC 6241, IETF RFC 6242, IETF RFC 6470, IETF RFC 8071, IETF RFC 7951, and IETF RFC 8639, all of which are hereby incorporated by reference in their entireties.

Although typically contained/encapsulated in Ethernet frames, as mentioned above, the C/U/S/M-Plane packets may have their own typically used protocols. The C/U-Plane 200/202 packets may use eCPRI/Radio over Ethernet (RoE)

headers/messages/protocols; the S-Plane 204 may use PTP; and the M-Plane 206 may use NETCONF/YANG headers/messages/protocols.

As shown in FIG. 2A, each one of the C/U Planes 200/202 may have individually defined traffic flows. The U-Plane 200 may have traffic flow 1*a*, Downlink (DL) Frequency Domain IQ Data, containing DL user data (e.g., user data (PDSCH), control channel data (PDCCH), etc.); traffic flow 1*b*, Uplink (UL) Frequency Domain IQ Data, containing UL user data (e.g., user data (PUSCH), control channel data (PUCCH), etc.); and traffic flow 1*c*, Physical Random Access Channel (PRACH) Frequency Domain IQ Data. The C-Plane 202 may have traffic flow 2*a*, DL & UL Scheduling Commands & Beamforming Commands, containing scheduling information, FFT size, CP length, subcarrier spacing, UL PRACH scheduling, beam index, etc.; traffic flow 2*b*, License Assisted Access (LAA) Listen Before Talk (LBT) configuration parameters and requests, containing LBT configuration parameters (e.g., IbtHandle, IbtDeferFactor, IbtOffset, etc.); and traffic flow 2*c*, LAA LBT status and responses, containing LBT DL indication parameters (e.g., InitialPartialSFs, bufferError, IbtCWR_Result, etc.). As indicated above, the S-Plane 204 may have traffic flow S, Timing & Synchronization, including PTP (IEEE 1588), and SYNChronous Ethernet (SyncE) Synchronization Status Message (SSM) traffic and packets. Additional details may be found in the O-RAN FH C/U/S-Plane standard. As also indicated above, the M-Plane 206 may have traffic flow M, non-real-time management and configuration information, which may have NETCONF/YANG headers, messages, packets, and information, which may, in turn, be carried using the IP/TCP stack layers. Additional details may be found in the O-RAN FH M-Plane standard.

Figure 2B:
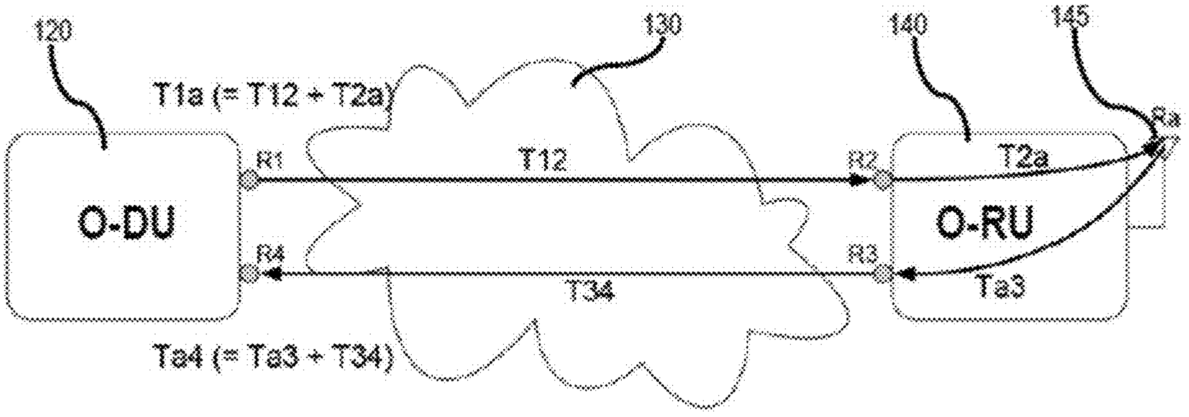
FIG. 2B is a block diagram illustrating the major timing parameters of the O-RAN fronthaul link between the O-DU and O-RU, which the packet analyzer(s) in the real-time FHA may test/analyze, according to an example.

FIG. 2B is a block diagram illustrating the major timing parameters of the O-RAN fronthaul link 130 between the O-DU 120 and O-RU 140, which the packet analyzer(s) 154 in the real-time FHA 150 may test/analyze, according to an example. For the most part, these timing parameters may refer to the traffic flow on the C/U-Plane 200/202. FIG. 2B shows an O-DU 120 and an O-RU 140 connected by an O-RAN fronthaul link 130, with several reference points for indicating the timing parameters: R1 and R2 on the DL from O-DU 120 to the O-RU 140, where R1 is located at the O-DU 120 and R2 is located at the O-RU 140; R3 and R4 on the UL from O-RU 140 to the O-DU 120, where R3 is located at the O-RU 140 and R4 is located at the O-DU 120; and Ra, located at the physical RF antenna 145.

Most timing parameters may be identified with reference to these reference points, or to the letters and/or numerals of these reference points. For example, the DL delay may be T12, the UL delay may be T34, with further qualifications such as, e.g., T12 min and T12 max indicating the minimum and maximum DL delays. As other examples, T1a may indicate the delay from the O-DU DL output (R1) to transmission over the air (Ra); T2a may indicate the delay from the O-RU DL input (R2) to transmission over the air (Ra); T3a may indicate the delay from (receiving) the transmission over the air (Ra) to the O-RU UL output port (R3); and T4a may indicate the delay from (receiving) the transmission over the air (Ra) to the O-DU UL input port (R4). Additional details may be found in the O-RAN FH C/U/S-Plane standard.

It is the relationships between the timing parameters on the O-RAN FH link 130 that are particularly stringent, not necessarily the individual parameters themselves. For example, it may be more important that packets in the traffic flow arrive within a particular reception window and transmit within a particular transmission window than individual packets arriving and departing at specific times. Moreover, because of new complexities and complications in developing 5G/6G cellular communication, such as, e.g., numerology, where the size and shape of any particular symbol may be different among the packet flows, and beamforming, both the necessity of keeping to precise transmission/reception windows may be more important and the ability to measure the important timing and other parameters may be more difficult (as discussed further below).

More specifically, and as an example, it takes some amount of time for the sender to transmit the packets in either direction (DL/UL) over the transmission media. However, the amount of data for any interval (e.g., symbol) can vary thus resulting in differing transmit times. This transmission time can be affected by several factors including (but not limited to) transport media rate, air interface bandwidth, and amount of data compression. The maximum amount of time allowed for the transmitter to send all data for an interval (transmission window) is defined by T1a max−Ta min. This is the allowed time, based on transport and O-RU characteristics, and its impacts on O-DU's is explained in clause 4.4.1.2 of the O-RAN FH C/U/S-Plane standard. To account for transport variation and transmission time, the receiver similarly implements a reception window. This allows packets containing samples for a specific symbol to be received within the window and still be transmitted at Ra at the time specified in the O-RAN standards.

The size of the reception window may account for both the maximum transmission time at the sender and the transport variation through the O-RAN fronthaul network. The result is the first of the delay relationships in the O-RAN FH C/U/S-Plane standard that may be met to ensure a working delay solution (see Table 4.4.2.1-1 et seq.), where T2a max−T2a min is the DL reception window, T1a max−T1a min is the DL transmission window, T4a max−T4a min is the UL reception window, T4a max−T4a min is the UL transmission window, while T12 max−T12 min is the allowed DL transport variation and T34 max−T34 min is the allowed UL transport variation. The above description is only of some specific examples, the full range and details of windows and other higher-level timing parameters which are to be met by a working O-RAN fronthaul link are detailed in, inter alia, the O-RAN FH C/U/S-Plane standard, the O-RAN FH M-Plane standard, and the O-RAN FH IOT standard. As used herein, the term "analytical timing measurements" may include, for example, any parameter, measurement, quantity, and/or quality discussed, described, and/or identified in any of the O-RAN standards.

At least because O-RAN is predicated upon, inter alia, providing standards/specifications for the successful interoperability between the O-DU 120 and the O-RU 140 on the O-RAN FH link 130 so that different telecommunication systems may be implemented by using various components from multiple vendors, the timing details, parameters, and tolerances of the communications on the O-RAN FH link 130 may also have standardized, industry-wide testing parameters to guarantee workability, many of which are described and detailed in the O-RAN FH C/U/S-Plane standard, the O-RAN FH M-Plane standard, and the O-RAN FH IOT standard. Accordingly, the O-RAN FH IOT standard lists and details test configurations, parameters, the O-RAN standards, including, e.g., the O-RAN FH C/U/S-Plane standard, the O-RAN FH M-Plane standard, and the O-RAN FH IOT standard, list and detail test configurations, parameters, measurements, etc., which may be used to prove the interoperability of any O-DU 120 with any other O-RU 140 over any O-RAN FH link 130.

For instance, the O-RAN FH IOT standard describes many tests for each of the C/U-Plane (sect. 2.2.3), the S-Plane (sect. 2.2.2), and the M-Plane (sect. 2.2.1) by the FHA, as well as appropriate testing tools and parameters. Moreover, other components and instruments may be used with the FHA to perform these tests, such as an O-CU emulator (including, e.g., 5G NR O-CU emulator), a network core emulator, an evolved Node B (eNB) emulator (including, e.g., a 4G LTE Master eNB (MeNB) or other MeNB emulator), an UE testers/emulator, optional beamforming network equipment, an Application Test Server, an RF Spectrum and/or Beam Signal Analyzer, and O-RU emulator, a flow traffic emulator, etc., as discussed at, e.g., Sect. 2.1.1.3 of the O-RAN FH IOT standard. As would be understood by one of ordinary skill in the art, the various examples in the present disclosure may be intended for use (and to be compliant) with both present, currently planned, and future testing protocols of the O-RAN FH IOT standard. See, e.g., Sect. 1.2.3 of the O-RAN FH IOT standard ("Future Enhancements"). However, as would also be understood by one of ordinary skill in the art, the various examples in the present disclosure are not in any limited by the present or future O-RAN FH IOT standard, but may be used for many other types of testing.

As mentioned above, there are multiple challenges with testing the O-RAN FH link 130, some but not all of which are discussed herein. Despite providing an intensive description of what is to be tested, the O-RAN standards provide no guidance on how to perform those tests, including how to create instrumentalities to provide such testing results. Moreover, previous telecommunication link analyzers provide limited guidance to creating such testing instrumentalities as some of the O-RAN testing parameters may be new and unique in detail and implementation to the O-RAN FH link 130, which effectively divides what was once a single component and layer (the PHY layer) into two components and two sub-layers (and the upper PHY layer for the O-DU and the lower PHY layer for the O-RU), thereby requiring relatively tight timing tolerances between the two (to at least match the overall timing of the previously-single device/component).

Presently, at least partially because of the new and novel nature of the O-RAN FH link 130 and its requirements, many who attempt to perform O-RAN FH link 130 testing have struggled to build their own ad hoc software and hardware for such testing. As far as is known, most instrumentalities that perform O-RAN FH link 130 testing use a capture method, where a snapshot of the O-RAN FH link 130 traffic flow may be captured (i.e., recorded/stored) in hardware and then analyzed, after the fact, usually in software (i.e., post-processing). Because of the tight timing and speed of the traffic flow on the O-RAN FH link 130, such instrumentalities may not be able to handle the traffic flow, becoming quickly overwhelmed by the flood of packets, even before the software may be able to perform any type of analysis. Furthermore, even with instrumentalities that perform O-RAN FH link 130 testing using the capture method, many parts of the analysis and processing required for O-RAN FH link 130 analysis may be performed sequentially, thereby delaying the analysis and processing in general. Furthermore, analysis of a snapshot does not take into consideration packets outside of the snapshot which may be outside tolerances.

As mentioned above, examples of a real-time O-RAN FHA 150 according to the present disclosure provide real-time analysis, processing, and measurement in hardware of the O-RAN FH link 130, rather than (and/or in addition to) post-processing in software of captured packets/frames from the O-RAN FH link 130. In examples of a real-time O-RAN FHA 150 according to the present disclosure, packet analysis may be performed/implemented in parallel in hardware, rather than serially in post-processing by software reading and accessing captured frames/packets. In examples of a real-time O-RAN FHA 150 according to the present disclosure, low level analysis of packet traffic flow over the O-RAN FH link 130 may be performed/implemented in hardware for continuous real-time processing, rather than (and/or in addition to) being performed by after-the-fact post-processing in software of captured packets/frames from the O-RAN FH link 130.

Figure 3:
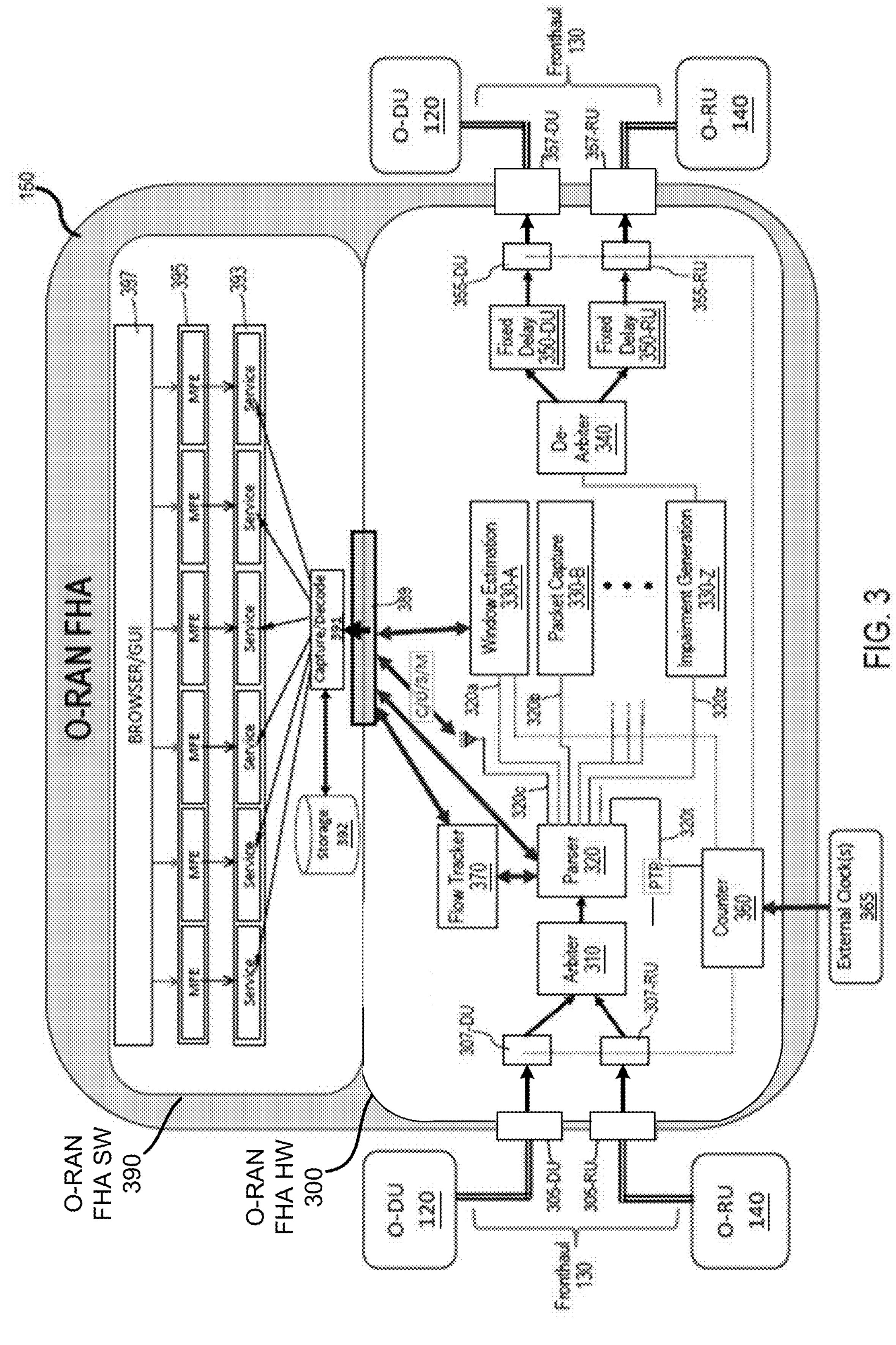
FIG. 3 is a block diagram illustrating components of a real-time O-RAN FHA depicted in FIG. 1, according to an example.

FIG. 3 is a block diagram illustrating components of the real-time O-RAN FHA 150 depicted in FIG. 1, according to an example. The number and arrangement of components shown in FIG. 3 are provided as an example. In practice, a real-time O-RAN FHA 150 according to examples of the present disclosure may include additional components, fewer components, different components, or differently arranged components than those shown in FIG. 3. Additionally, or alternatively, a set of components (e.g., one or more components) of a real-time O-RAN FHA 150 according to examples of the present disclosure may perform one or more functions described as being performed by another set of components of a real-time O-RAN FHA 150 according to examples of the present disclosure, as would be understood by one of ordinary skill in the art.

FIG. 3 may further omit parts, components, circuit paths, etc., in the real-time O-RAN FHA 150 not directly germane to examples of the present disclosure, as would be understood by one of ordinary skill in the art. For instance, a circuit path for a low latency/non-intrusive packet flow through the real-time O-RAN FHA 150 which may by-pass most of the components in the real-time O-RAN FHA 150 by more or less directly linking the inputs and outputs, is not shown in FIG. 3.

In FIG. 3, an O-RAN FH link 130 may be between an O-DU 120 and an O-RU 140. A real-time O-RAN Fronthaul Analyzer (FHA) 150 may include a hardware component (HW) 300 and a software component (SW) 390. As would be understood by one of ordinary skill in the art, while called the software component, the O-RAN FHA SW 390 may include hardware on which the software would run, and the term O-RAN FHA SW 390 may be used to distinguish those parts of the real-time O-RAN FHA 150 whose relevant components (e.g., those components for testing, analyzing, and measurements, as well as generating content for, and interpreting commands from, a user I/O interface) exist in the form of software/firmware from those parts of the real-time O-RAN FHA 150 whose relevant components (e.g., those components for testing, analyzing, and measurements, as well as generating content for, and interpreting commands from, a user I/O interface) exist in the form of hardware/firmware, i.e., the O-RAN FHA HW 300.

In some examples, the O-RAN FHA HW 300 may include a hardware accelerator. As used herein, a "hardware accelerator" may be any group of programmable logic blocks with reconfigurable interconnects, such as, e.g., a Programmable Logic Device (PLD) and/or Programmable Read-Only Memory (PROM), and may include an Application-Specific Integrated Circuit (ASIC), a programmable gate array, a Field Programmable Gate Array (FPGA), and/or Configurable Logic Blocks (CLBs) with Lookup Tables (LUTs), Reconfigurable Acceleration Devices (RADs), or the like, and may have one or more soft processor cores, one or more hard processor cores, one or more general purpose Advanced Reduced Instruction Set Computer (RISC) Machine (ARM) core processors, one or more vector processors, one or more memories, one or more inputs and/or outputs, one or more memory controllers, one or more Networks-on-Chip (NoCs) to provide a pervasive system-wide network, one or more network controllers, one or more network interfaces, and/or one or more transceivers, as would be understood by one of ordinary skill in the art. In some examples, the hardware accelerator may include an FPGA and associated peripherals, such as, e.g., one or more Double Data Rate (DDR) memories, one or more clocks, one or more Phase-Locked Loops (PLLs), etc., as would be understood by one of ordinary skill in the art.

An overview of the traffic flow through the O-RAN FHA HW 300 in FIG. 3 is presented below. In some examples, the packet traffic flow on the O-RAN FH link 130 may include Ethernet packets of varying configurations such as, e.g., 10 Gb, 25 Gb, and 100 Gb.

As shown in FIG. 3, the packet flow traffic from O-DU 120 may enter FHA HW 300 through an input 305-DU, while the packet flow traffic from O-RU 140 may enter FHA HW 300 through an input 305-RU. In some examples, each of the inputs 305-DU and 305-RU may include a Quad Small Form-factor Pluggable (QSFP) transceiver/interface port. The O-DU packet flow from the input 305-DU and the O-RU packet flow from the input 305-RU then may be forwarded to a Medium Access Controller (MAC) receiver 307-DU and a MAC receiver 307-RU, respectively, which may timestamp all of the packets in the incoming flows using the timing clock signal (shown by the dotted line) from a Counter 360. The timing clock signal from the Counter 360 may set a system-wide standard time by which the O-RAN FHA HW 300 may perform analysis, in hardware, of the packet traffic flow in real time (examples of which are described in greater detail below) and the O-RAN FHA SW 390 may perform analysis of the packet traffic flow and generate continuous real-time output representing data concerning the O-RAN FH link 130. As used herein, the phrase "maintain a clock" may refer to selecting and/or generating a reference timing signal for system-wide use on the hardware accelerator.

The Counter 360 may maintain a clock using, for example, incoming S-Plane PTP packets from a PTP master at the O-DU 120 (routed to the Counter 360 by the Parser 320, discussed further below), one or more External Clocks 365, and/or a stable internal oscillator which may keep time within a billionth of a second deviation (i.e., nanosecond timing resolution). In some examples, the stable internal oscillator may include a Voltage-Controlled Oscillator (VCO). Under some conditions, including, e.g., when the packet traffic flow on the O-RAN FH link 130 is on-time and not congested, the Counter 360 may use the PTP timing information in the incoming S-Plane PTP packets. Under some conditions, including, e.g., when the packet traffic flow on the O-RAN FH link 130 is delayed (perhaps caused by congestion) or when the timing received via the incoming S-Plane PTP packets is otherwise degraded, the Counter 360 may switch to External Clock(s) 365 and/or a highly accurate internal timing oscillator.

In some examples, the Counter 360 may include a hardware module which may receive and parse in-coming PTP packets in order to synchronize the Counter 360. In some examples, such a hardware module may include an ARM core processor embedded in the O-RAN FHA HW 300. In some examples, such a hardware module may include a processor from the x86 family, a PowerPC (PPC) processor, and/or an Intel multicore processor. The External Clock(s) 365 may be any suitable reference time source, as would be understood by one of ordinary skill in the art. In some examples, the External Clock(s) 365 may provide one or more Global Navigation Satellite System (GNSS) timing signals, such as, e.g., a Global Positioning System (GPS) timing signal. In some examples, the External Clock(s) 365 may provide both a one pulse per second (1PPS) signal and a Time of Day (ToD) signal, which may be received from an external GPS receiver and may be used in order to synchronize the Counter 360. In some examples, the External Clock(s) 365 may include one or more external clock generation/synchronization subsystems and/or chips.

In some examples, the Counter 360 may include a ToD counter which may be initialized and incremented by an internal clock that has its frequency adjusted by at least one of the following inputs: the PTP packets received from/on the circuit path 320*t*; a 1PPS signal at 10 MHz from the External Clock(s) 365; and/or a 1PPS/ToD signal from the External Clock(s) 365. In some examples, the Counter 360 may be a register with a suitable number of bits to maintain a sufficient timing accuracy—for instance, 64 bits may be sufficient to maintain a timing accuracy within about one nanosecond. In some examples, the Counter 360 may be implemented as a hardware register with logic gates, clocked by an internal oscillator, and accessible by other components via a memory mapped address.

In some examples, the Counter 360 may include an auto-detect mechanism to select which timing signal source to use as a primary timing signal, e.g., the PTP packets (parsed and synchronized in hardware circuitry), one or more External Clock(s) timing signals (e.g., GPS signals, timing package/chip signals), and/or an internal timing signal generated by an on-board timing oscillator capable of nanosecond resolution. In some examples, the user may choose a primary timing source and/or select an auto-detect mechanism in order to synchronize the Counter 360. In some examples, the Counter 360 may combine two or more timing sources together to generate a primary timing signal. In some examples, the Counter 360 may recover synchronization for Synchronous Ethernet (SyncE) transparency. In some examples, the real-time O-RAN FHA 150 may provide bidirectional SyncE clock recovery, which may avoid any break/interrupt of the SyncE line frequency from, e.g., the O-DU 120 to the O-RU 140 (in network configuration LLS-C1), which may be beneficial when in either intrusive mode. In such examples, the real-time O-RAN FHA 150 may provide SyncE line transparency in each direction ("bidirectional SyncE clock transparency"), i.e., a recovered clock from inputs 305 to transmit clock of outputs 357 and vice-versa, which may be beneficial for both the non-intrusive and intrusive modes.

In typical telecommunication link analyzers, such low level timing synchronization and analysis per packet may be performed mostly via software on one or more captured packets/frames of the packet traffic flow on the link (i.e., post-processing of captured traffic packets/frames in storage/memory). By contrast, the O-RAN FHA HW 300 according to examples of the present disclosure provides processing such as, low level timing synchronization and analysis on a per packet basis, in real-time (i.e., real-time-processing of tapped traffic packets/frames currently being transmitted/received on the O-RAN FH link 130).

Returning to the packet traffic flow through the O-RAN FHA HW 300, an Arbiter 310 may combine the timestamped packets from each of the MAC receivers 307-DU and

307-RU into a single stream. In some examples, the resulting single stream has twice the data rate as the individual O-DU or O-RU packet flows. Combining the two flows at high speed in hardware into a single stream may be helpful at least because some of the timing parameters, measurements, and tolerances analyzed in the real-time O-RAN FHA 150 are based on the relative timings of packets from one flow with the packets of another. For instance, as discussed above, because each C-Plane packet (transmitted on the downlink) associated with an uplink U-Plane packet should be received before the associated uplink U-Plane packet is transmitted, having both the C-Plane packet from the downlink and its associated U-Plane packet from the uplink immediately available in the same stream may be beneficial when performing, for example, a C/U-Plane Timing Analysis. In some examples, the Arbiter 310 may combine additional packet traffic flows with the O-DU and O-RU packet flows.

The single stream of timestamped packets then enters the Parser 320 which may appropriately sort and route the packets by parsing the appropriate header information in each packet. In some examples, the sorting and routing may also be determined by user set criteria and/or parameters set by the type of analyses being performed in the real-time O-RAN FHA 150. As used herein, the term "routing criteria" may refer to any set of one or more conditions, parameters, and/or qualities of any packet and/or frame on an O-RAN FH link 130 (and thus, like in common usage, the term "criteria" as used herein may refer to either or both the singular and the plural, like "agenda" and "data").

As shown in FIG. 3, multiple circuit paths may lead out from the Parser 320 to other components on the O-RAN FHA HW 300, including, for example, a circuit path 320*a* to a Window Estimation hardware packet analyzer 330-A, a circuit path 320*b* to a Packet Capture hardware packet analyzer 330-B, a circuit path 320*c* to a HW/SW interface 389 with the O-RAN FHA SW 390, a circuit path 320*t* to the Counter 360, multiple unlabeled circuit paths (indicated by dashed lines) to other possible hardware packet analyzers and/or other components with other functionalities, a circuit path 320*z* to an Impairment Generation hardware packet analyzer 330-Z, and many other circuit paths not specifically shown in FIG. 3 to other possible components on the O-RAN FHA HW 300 not specifically shown here. For example, an up-down arrow between the Parser 320 and the Flow Tracker 370 indicate one or more circuit paths with communications going in both directions (as both control instructions and metadata, among other information, may flow between the Parser 320 and the Flow Tracker 370). The multiple circuit paths leading to and from the Parser 320 may carry, in addition to packets routed by the Parser 320 according to a routing criteria, control instructions (such as, e.g., action bits and/or action fields), data, metadata, and the like, some of which are described in greater detail below.

As used herein, "hardware packet analyzer" refers to any type of hardware component or module in/on the O-RAN FHA HW 300 that may process, analyze, measure, scan, quantify, estimate, evaluate, modify, and/or further parse any packet received by the O-RAN FHA 150. In some examples, a hardware packet analyzer may include digital and/or analog circuitry (e.g., one or more transistors, logic gates, registers, memory devices, resistive elements, conductive elements, capacitive elements, and/or the like, as would be understood by one of ordinary skill in the art) and/or more complex discrete hardware components such as, e.g., a single- and/or multi-chip processor, a single- and/or multi-core processor, a digital signal processor (DSP), an application specific integrated circuit (ASIC), a field programmable gate array (FPGA), or other programmable logic device, discrete gate or transistor logic, other discrete hardware components, and/or any combination thereof suitable to perform any of the functions described herein, as would be understood by one of ordinary skill in the art.

In some examples, the Parser 320 may use metadata parsed from the headers of the incoming packets along with routing criteria in order to perform certain functions. For example, as described in detail below, if a C/U-Plane Timing Analysis is to be performed, the Parser 320 may, in accordance with the routing criteria, use the parsed metadata to identify the packets in the C/U-Plane, and then may route those identified C/U-Plane packets on the circuit path 320*a* to the Window Estimation hardware packet analyzer 330-A where C/U Timing Analysis may be performed. As another example, as described in detail below, if a Packet Capture operation is to be performed, the routing criteria may indicate what kind, type, and/or number of packets are to be captured, the Parser 320 may, in accordance with the routing criteria, use the parsed metadata to identify the packets to be captured, and then may route those identified packets on the circuit path 320*b* to the Packet Capture hardware packet analyzer 330-B. As another example, as described in detail above, the Counter 360 may use the incoming S-Plane PTP packets as part of maintaining the clock, thus the Parser 320 may, in accordance with the routing criteria for the timing functionality, use the parsed metadata to identify the S-Plane PTP packets, and then may route those identified S-Plane PTP packets on the circuit path 320*t* to the Counter 360. In such an example, the Counter 360 may include PTP processing software and a suitable servo (such as, e.g., the embedded ARM core processor discussed above). As yet another example, if the O-RAN FHA SW 390 is to perform a higher-level M-Plane analysis, the Parser 320 may, in accordance with the routing criteria for the higher-level M-Plane analysis, use the parsed metadata to identify the packets in the M-Plane, and then may route those identified M-Plane packets on the circuit path 320*c* to the HW/SW interface 389 for transmittal to the O-RAN FHA SW 390 for the higher-level M-Plane analysis.

In some examples, the Parser 320 parses specific header fields of the incoming packets for metadata and may use the resulting metadata to appropriately route individual packets and/or packet flows and/or supply the metadata to the Flow Tracker 370. In some examples, the Parser 320 may be implemented as a Programming Protocol-independent Packet Processor (P4), which is an open source, domain specific programming language for network devices, specifying how data plane devices (switches, routers, Network Interface Controllers (NICs), filters, etc.) process packets in hardware. In some examples, the Parser 320 may be designed directly using Hardware Description Language (HDL) and/or implemented using Node Processing Unit (NPU) type blocks/functions, Tensor Processing Units (TPUs), and/or any other suitable means, as would be understood by one of ordinary skill in the art. In some examples, P4 tables may be implemented using multiple memory mapped tables, such as, e.g., Content Addressable Memory (CAM), Direct CAM (DCAM), Binary CAM (BCAM or BiCAM), Ternary CAM (TCAM), Semi-Ternary CAM (STCAM) tables; block RAM (BRAM), ultra-RAM (URAM), and the like; as well as other hash tables with match fields, as would be understood by one of ordinary skill in the art.

In some examples, the Flow Tracker 370 may use the metadata from the Parser 320 to track whether each Ethernet frame is a new type of frame flow or a frame flow that has been received before. In some examples, the metadata parsed by the Parser 320 and/or used by the Flow Tracker 370 may include, for example, a source address, a destination address, an Ethernet MAC address, a Virtual Local Area Network (VLAN) tag and ID, an EtherType, an eCPRI Message Type, an extended Antenna-Carrier identification (eAxC ID), data direction, source IP address, destination IP address, etc., as would be understood by one of ordinary skill in the art. The Flow Tracker 370 may maintain details and statistics for each flow—if there is a new flow, the new flow may be entered and initialized for tracking by the Flow Tracker 370; if it is an existing flow, the statistics for that flow may be updated (for example, its frame and byte count may be incremented). Statistics maintained by the Flow Tracker 370 may include, for example, packet count, the total bytes of each flow, timestamps of corresponding packets, etc. The Flow Tracker 370 may allow the tracking of the complete information about each flow, such as, e.g., each individual C-Plane, U-Plane, S-Plane, and M-Plane packet flows on the O-RAN FH link 130. In some examples, the Flow Tracker 370 may be implemented as pipeline arrays and processor-less block RAM (BRAM). In some examples, the Parser 320 may parse packets per Ethernet MAC layer and Layer 2 through Layer 4, as well as basic eCPRI/O-RAN headers, in order that the Flow Tracker 370 may maintain Layer 2 counters and statistics (aggregated per port), as well as flow discovery and tracking per connection.

The O-RAN FHA SW 390 may periodically query and receive data to and from the Flow Tracker 370 via a HW/SW interface 389 for analysis, processing, and then presentation on a Browser/GUI 397. In some examples, the HW/SW interface 389 may include a Peripheral Component Interconnect Express (PCIe) Subsystem, and/or another suitable card/bus subsystem, as would be understood by one of ordinary skill in the art. In some examples, the Browser/GUI of O-RAN FHA SW 390 may present a user with filtering or action selections (such as, e.g., capture, window analysis, real-time software (SW) analysis, etc.) for any user-selected flow. In such examples, when the user chooses a specific packet flow and a matching particular action for that packet flow, O-RAN FHA SW 390 may enter a TCAM function in the Parser 320 with a rule (typically identifying a flow) and the action, which results in action bits indicating the appropriate routing and/or downstream processing for the packet flow. In such examples, this may be how the Parser 320 uses the metadata parsed from the incoming packets to appropriately route individual packets and/or packet flows. One or more hardware packet analyzers 330 perform such downstream processing.

Accordingly, the Parser 320 may route one or more packets and/or packet flows for downstream processing by the one or more hardware packet analyzers 330, which may perform, e.g., analyses, hardware processing, measurements, and/or the like on the particular received packets and/or packet flow(s). In the example of FIG. 3, three different hardware packet analyzers are shown: a Window Estimation hardware packet analyzer 330-A to analyze packet flows in terms of, e.g., transmission/reception windows, latency in general, early/late/on-time packets, etc., a Packet Capture hardware packet analyzer 330-B to capture and analyze packets based on user-set criteria, and an Impairment Generation hardware packet analyzer/block 330-Z to generate impairments on packets. The Impairment Generation hardware packet analyzer/block 330-Z is equivalent to and is also referenced herein as the impairment generator 152.

For instance, a user may select the C/U-Plane Timing Analysis function using the O-RAN FHA SW 390, so that the O-RAN FHA SW 390 may configure the TCAM in the Parser 320 with the appropriate rule (i.e., select the C/U-Plane packet flows) and the matching action (i.e., (i) route the selected packet flow to the Window Estimation hardware packet analyzer 330-A; and (ii) direct the Window Estimation hardware packet analyzer 330-A to perform the appropriate hardware processing). In some examples, the selected flow may be accompanied by action bits or an action field (generated by the Parser 320), which serves as instructions/control information for the specific hardware packet analyzer; such action bits may be routed via separate control circuitry/pathways from the Parser 320 to each of the hardware packet analyzers 330 as well as other analytical/measuring/processing/etc. components on the O-RAN FHA HW 300.

In this example/instance, the action bits/field accompanying the C/U-Plane packet flows to the Window Estimation hardware packet analyzer 330-A may instruct the Window Estimation hardware packet analyzer 330-A to perform real-time packet analysis in hardware to directly measure/calculate/determine early/late/on-time packet arrival for at least one of the C/U-Plane transmission/reception windows. In some examples, the user may select threshold values for the C/U-Plane Timing Analysis using, for example, a pull-down menu, a touchscreen, or a keyboard of the Browser/GUI 397 of the O-RAN FHA SW 390, which will result in the O-RAN FHA SW 390 programming/instructing/controlling the O-RAN FHA HW 300 to use the entered threshold values as stored hardware register values to be machine matched, set, calculated from, and the results stored in other hardware registers. The O-RAN FHA SW 390 may query those hardware registers in the O-RAN FHA HW 300 based on an event (such as, e.g., user input) or periodically/on a set schedule, and display those values and/or further analyze/process them for higher-level analysis or simpler visual graphical representation. In some examples, the O-RAN FHA SW 390 may set/control the O-RAN FHA HW 300 to continuously transmit the calculated values in real-time so that the Browser/GUI 397 of the O-RAN FHA SW 390 may present a visual display of those values and/or an intuitive graphical representation of the same information to the user in real-time.

In some examples, the Window Estimation hardware packet analyzer 330-A may perform monitoring of the C/U-Plane packets using CAM filtering rules provided by the Parser 320. Early, late, and on-time windows as specified in the O-RAN FH C/U/S-Plane standard may be calculated here and presented to the user via the O-RAN FHA SW 390. In some examples, C/U Timing Analysis may be performed via the Window Estimation hardware packet analyzer 330-A using the timing signal provided by the Counter 360.

As another instance, a user may select a Packet Capture function using the O-RAN FHA SW 390, so that the O-RAN FHA SW 390 may configure the TCAM in the Parser 320 with the appropriate rule (i.e., select the user-identified packets and/or packet flows) and the matching action (i.e., (i) route the selected packet flow to the Packet Capture hardware packet analyzer 330-B; and (ii) direct the Packet Capture hardware packet analyzer 330-B to store the packets and perhaps perform appropriate hardware processing). In such an example, the selected packets/packet flow(s) being routed by the Parser 320 to the Packet Capture hardware packet analyzer 330-B may be accompanied by action bits/field which instructs the Packet Capture hardware packet analyzer 330-B to capture the selected packets/packet flows and store them in, e.g., a Double Data Rate (DDR) buffer. In some examples, the Packet Capture hardware packet analyzer 330-B, following instructions indicated by the action bits/field, may implement a line rate dual port capture by making use of separate (or integrated) DDR components and/or Dual In-line Memory Modules (DIMMs) to store the packets/packet flows based on some criteria. For example, a separate capture buffer may be implemented for each direction, i.e., the UL and the DL, or for each plane, e.g., the C-Plane and the U-Plane; or by matching C-Plane packets to the U-Plane packets they pertain to; or by some other criteria, which criteria may be set by a user, or by the O-RAN FHA SW 390 for higher-level analysis and reporting/monitoring, etc. In some examples, the Packet Capture hardware packet analyzer 330-B may support dual port 100-Gbps line rate capture.

In these examples involving the Packet Capture hardware packet analyzer 330-B, the timestamp put on the individual packets upon entering the O-RAN FHA HW 300 by the MAC receivers 307 may play a crucial role in analysis by, for example, providing a "real-time" check separate from the time(s) already stored in the packet headers by the sender. In some examples, these O-RAN FHA HW 300-generated timestamps may be saved as corresponding metadata for each captured packet. When requested, these timestamps along with the other metadata and, in some examples, the Packet Capture hardware packet analyzer 330-B may provide the captured packets themselves to the O-RAN FHA SW 390 for higher-level analysis and processing. In some examples, the action bits/field may also indicate a trigger threshold for the buffer storage, which may, e.g., inform the O-RAN FHA SW 390 or its user of the event, or automatically purge the buffer and send its contents to the O-RAN FHA SW 390 for higher-level analysis and processing. The O-RAN FHA SW 390 may use the timestamped packets from the capture buffer for, e.g., offline decode functionalities. In some examples, C/U/S/M-Plane packet flows may be captured in Double Data Rate Synchronous Dynamic Random Access Memory (DDR-SDRAM) embedded in the Packet Capture hardware packet analyzer 330-B.

In typical telecommunication link analyzers, such low level timing synchronization and analysis per packet as the Window Estimation and Packet Capture functions described above may be performed mostly via software on one or more captured packets/frames (stored in hardware) of the packet traffic flow on the link (i.e., post-processing of captured traffic packets/frames in storage/memory). By contrast, the O-RAN FHA HW 300 according to examples of the present disclosure provides processing such as, e.g., Window Estimation, C/U Timing Analysis, in real-time by hardware (i.e., real-time-processing of tapped traffic packets/frames from the O-RAN FH link 130).

As indicated by the three dots in between the hardware packet analyzers 330 of FIG. 3, there may be any number of hardware packet analyzers 330 in the O-RAN FHA HW 300, which may perform a wide variety of functions, analyses, and/or measurements, including, but not limited to, other measurements and testing specified in the O-RAN FH C/U/S-Plane standard, the O-RAN FH M-Plane standard, and/or the O-RAN FHA IOT standard. For example, according to examples of the present disclosure, one or more of hardware packet analyzers 330 in the O-RAN FHA HW 300 may perform functions such as, e.g., I/Q Transmission Analysis, M-Plane Analysis, S-Plane Analysis, M-Plane Client Analysis (which may involve measurements and timing analysis of the Network Configuration Protocol (NETCONF)), and the lower-level processing involved in C/U-Plane Physical Resource Block (PRB) Utilization Analysis, some of which are described in greater detail below.

As another instance, a user may select specific packets/packet flows of interest for generating impairments using the O-RAN FHA SW 390, so that the O-RAN FHA SW 390 may configure the TCAM in the Parser 320 with the appropriate rule (i.e., select the user-identified packets and/or packet flows) and the matching action (i.e., (i) route the selected packet flow to the Impairment Generation hardware packet analyzer 330-Z; and (ii) direct the Impairment Generation hardware packet analyzer 330-Z to apply one or more impairments on the received packets, perhaps different impairments depending on other conditions, and forward the impaired packet so that they re-enter the live, real-time packet traffic flow on the O-RAN FH link 130). In such an example, the selected packets/packet flow(s) being routed by the Parser 320 to the Impairment Generation hardware packet analyzer 330-Z may be accompanied by action bits/field which instruct the Impairment Generation hardware packet analyzer 330-Z to delay (i.e., Packet Delay Variation—PDV) or even drop the packet/packet flow entirely as discussed herein.

In some examples, the Impairment Generation hardware packet analyzer 330-Z (impairment generator 152), following instructions indicated by the action bits/field, may establish a specific delay, delay range/window, or jitter, for the selected packets/flow(s). In some examples, the Impairment Generation hardware packet analyzer 330-Z, following instructions indicated by the action bits/field, may generate header field errors in packets of the selected packets/flow(s). It is considered that, in some examples, the Impairment Generation hardware packet analyzer 330-Z, following instructions indicated by the action bits/field, may generate low level spoofing and/or security hazards in packets of the selected packets/flow(s) in order to test the security of the system. In these examples involving the Impairment Generation hardware packet analyzer 330-Z, the timestamp put on the individual packets upon entering the O-RAN FHA HW 300 by the MAC receivers 307-DU/307-RUs may play a role in, for example, generating the appropriately synchronized and timed impairments, or providing a "real-time" check separate from the time(s) already stored in the packet headers by the sender.

As mentioned above, and in some examples, only the packets/packet flow(s) output from the Impairment Generation hardware packet analyzer 330-Z actually "flows through" the O-RAN FHA HW 300 to re-enter the packet traffic flow on the O-RAN FH link 130, as indicated by the line connecting the output of the Impairment Generation hardware packet analyzer 330-Z to a De-Arbiter 340. The De-Arbiter 340 takes the single stream of packets/flow(s) from the Impairment Generation hardware packet analyzer 330-Z and splits the packets/flow(s) into respective target paths based on, e.g., action bits/field provided by either the Impairment Generation hardware packet analyzer 330-Z or the Parser 320, and/or the original metadata of the packet upon entering the O-RAN FHA HW 300. This information may include port information, indicating whether the packet was received by the O-RAN FHA HW 300 by input 305-DU/MAC receiver 307-DU (i.e., the transmissions on the O-RAN FH link 130 from the O-DU 120) or by input 305-RU/MAC receiver 307-RU (i.e., the transmissions on the O-RAN FH link 130 from the O-RU 140). If the packet was received at input 305-DU/MAC receiver 307-DU, it may be forwarded on to be transmitted to O-RU 140; if the packet was received at input 305-RU/MAC receiver 307-RU, it may be forwarded on to be transmitted to O-DU 120.

More specifically, as shown in FIG. 3, the packet traffic flow intended for O-DU 120 may be sent to a Fixed Delay 350-DU, while the packet traffic flow intended for O-RU 140 may be sent to a Fixed Delay 350-RU. Fixed Delays 350 may compensate for the delay introduced by the individual packets going through the various data paths and circuitry of the O-RAN FHA HW 300. In some examples, the Fixed Delays 350 may assist in ensuring that S-Plane PTP packets and C/U timing packets are not subject to Packet Delay Variation (PDV) or delay asymmetry in either direction. The various circuit paths of differing lengths and complexity through which the various packets may go through, may cause delay, which may vary from build to build of the O-RAN FHA HW 300. Accordingly, in some examples, for each build of the O-RAN FHA HW 300, the worst case delays for each data path may be determined, and the Fixed Delays 350 may be set such that all packets exiting the O-RAN FHA HW 300 may have the same delay, which may be easily compensated for by whichever unit on the O-RAN FH link 130 receives the packets.

The O-DU packet flow traffic exits Fixed Delay 350-DU and may enter MAC transmitter 355-DU, while the O-RU packet flow traffic exits Fixed Delay 350-RU and may enter MAC transmitter 355-RU before exiting the O-RAN FHA HW 300 and re-entering the packet traffic flow on FH link 130 via an output 357-DU and an output 357-RU, respectively. In some examples, the general purpose of the MAC transmitters 355 may be to ensure that frames going back onto the O-RAN FH link 130 may have the proper format to meet the IEEE 802.3 standard (with, e.g., a Frame Check Sequence (FCS)/Cyclic Redundancy Check (CRC), a proper interface gap, Physical Coding Sublayer (PCS)/Physical Layer encoding, etc.). In some examples, the MAC transmitters 355 may receive a timing signal from the Counter 360 which may be used to adjust the PTP correction field in S-Plane packets when the real-time O-RAN FHA 150 may include a PTP boundary clock (i.e., a Telecom Boundary Clock (T-BC) and/or Telecom Transparent Clock (T-TC) function). In some examples, the MAC transmitters 355 may use the timing signal when the real-time O-RAN FHA 150 may be emulating S-Plane impairments.

In some examples, the MAC receivers 307 may be timestamping incoming packets with an accuracy of about 20-30 ns. In some examples, an accuracy of about +/−100 ns may be maintained for the packets flowing thru the real-time O-RAN FHA 150 in intrusive mode with some fixed delay of about 2-15 microseconds depending on the line rate. In some examples, the parsing/processing of received frames may be roughly a few hundred nanoseconds after the first bit/symbol is received at the inputs 305. In some examples, processing in "real-time" may be understood as processing every received frame in real-time O-RAN FHA 150 and performing some real-time operation on each frame (such as, e.g., parsing, defining/identifying a packet flow, and/or counting or performing some other function on a per frame or per frame payload basis).

In various examples of the present disclosure, the packet flows from one, some, or all of the hardware packet analyzers 330 may or may not be forwarded onward in the real-time O-RAN FHA 150, i.e., the packets exiting from one, some, or all of the hardware packet analyzers 330 may or may enter the next three modules, e.g., the De-Arbiter 340, one of Fixed Delays 350-A and 350-B, and one of MAC transmitters 355-DU and 355-RU. In some examples of the real-time O-RAN FHA in the intrusive mode, all packet flows from the hardware packet analyzer(s) 330 (and/or any traffic routed elsewhere by the Parser 320) would continue to the De-Arbiter 340, which separates the incoming packets into appropriate traffic flows for the O-DU 120 and O-RU 140, in a manner complementary and opposite to the combining process performed by the Arbiter 310. In other examples of the intrusive mode, packet flows exiting from only some or one hardware packet analyzer 330 would be forwarded to the De-Arbiter 340 as part of the process of being re-introduced to the traffic flow on the FH link. For instance, in the example shown in FIG. 3, only the packet flow from the Impairment Generation hardware packet analyzer/block 330-Z continues onto the De-Arbiter 340 and other modules to be re-introduced into the traffic flow on the O-RAN FH link.

In some examples, the real-time O-RAN FHA 150 may have a low-latency/non-intrusive mode which may employ circuit paths which run directly from input 305-DU to output 357-RU and directly from input 305-RU to output 357-DU with the same parallel transceiver data and recovered clock. In examples using such a low-latency/non-intrusive mode, the packet flow through the real-time O-RAN FHA 150 may bypass most of the interior components, such as, e.g., the Arbiter 310, the Parser 320, the De-Arbiter 340, and the Fixed Delays 350-DU and 350-RU.

In some examples, where less than all of the incoming packet flows may be, after analysis by the O-RAN FHA HW 300, output to rejoin the packet traffic flow on the O-RAN FH link 130, or when in non-intrusive mode, only copies of the O-RAN FH link packet traffic flow may actually enter the real-time O-RAN FHA 150 in real-time. In such examples, a splitter may be used so a replica of the packet traffic flow on the O-RAN FH link 130 enters the real-time O-RAN FHA 150 for analysis in real-time. In examples specifically like FIG. 3, where only the Impairment Generation hardware packet analyzer/block 330-Z generates packet traffic which will re-enter the traffic flow on the O-RAN FH link 130, the real-time O-RAN FHA 150 may route all other packet traffic around the components in the O-RAN FHA HW 300 directly to the exiting modules. In some examples, the O-RAN FHA HW 300 may support a low latency Layer 1 flow-thru mode and/or a low-time-error Layer 2 intrusive mode.

As described in detail above, after all, some, or none of the packet traffic from one or more of the hardware packet analyzers 330 may be separated into two streams by De-Arbiter 340, one containing O-DU traffic and the other containing O-RU traffic, the two streams may be modified by Fixed Delays 350, which may ensure the packets may be synchronized appropriately with the other traffic on the O-RAN FH link 130, transmitted by MAC transmitters 355, and exit through outputs 357 to re-enter the packet traffic flow of the O-RAN FH link 130.

As shown in FIG. 3, O-RAN FHA SW 390 has an HW/SW interface 389 with the O-RAN FHA HW 300 through which the two parts of the real-time O-RAN FHA 150 communicate and exchange control, management, and other forms of data. As mentioned above, HW/SW interface 389 may include a Peripheral Component Interconnect Express (PCIe) Subsystem, but may also include any of a wide variety of communication connections, such as, e.g., a suitable Network Interface Controller or Card (NIC) or any appropriate physical network/device interface, as would be understood by one of ordinary skill in the art. As mentioned above and shown by the arrows in FIG. 3, some of the components in the O-RAN FHA HW 300 which may communicate through HW/SW interface 389 include, but are obviously not limited to, the Flow Tracker 370, which may provide data concerning packet traffic flow; the Parser 320, which may receive control signals representing user commands, instructions, and other parameters from the O-RAN FHA SW 390; and one or more of the hardware packet analyzers 330, which both may receive instructions/data and transmit measurements/notes/low-level hardware analyses to O-RAN FHA SW 390 (which also get control signals—"actions bits"—and instructions from the Parser 320). In addition, at least one of the circuit paths out of the Parser 320 may connect directly to HW/SW interface 389 (as shown by arrow labelled "C/U/S/M") to deliver specific packets and packet traffic flows to O-RAN FHA SW 390 for higher level I/Q and O-RAN analysis, such as, e.g., PTP, Ethernet Synchronization Messaging Channel (ESMC), M-Plane packets, as well as certain C/U-Plane packet flows. In some examples, the O-RAN FHA HW 300 may also include a capture component to capture and hold certain Ethernet frames for further study/analysis by O-RAN FHA SW 390.

Returning to FIG. 3, the O-RAN FHA SW 390 may have a Storage 392, a Capture/Decode block 391, a Service layer 393, a Micro Front End (MFE) layer 395 and a Browser/Graphical User Interface (GUI) 397. Capture/Decode block 391 receives the raw information from the O-RAN FHA HW 300 and forwards individual parts of it to the appropriate service modules in the Service layer 393 and/or onto Storage 392. Storage 392 may store, for example, captured packet traffic flow captured using a packet capture Application Programming Interface (API), such as, e.g., pcap. Capture/Decode block 391 may pass parameters between O-RAN FHA SW 390 and the O-RAN FHA HW 300 via the HW/SW interface 389 using a Remote Procedure Call (RPC) framework, such as, e.g., gRPC. Moreover, gRPC calls may be used to provide information and data, such as metadata of the C/U-Plane frames and/or the C/U-Plane packets/frames themselves, from Capture/Decode block 391 to the services (shown as the boxes) in Service layer 393. MFE layer 395 may include multiple MFE web components (shown as the boxes), which may communicate with the services in Service layer 393 via Representational State Transfer (REST) APIs. The multiple MFE web components in MFE layer 395 may communicate with Browser/GUI 397 to present information, graphics, and other data to a user. By using the data collected from the O-RAN FHA HW 300, the services in the Service layer 393 and the MFEs in the MFE layer 395 provide frontend services to be displayed on Browser/GUI 397, such as, e.g., Flow Explorer, C/U-Plane Timing Analysis, M-Plane Analysis, S-Plane Analysis, and an M-Plane Stack application. In some examples, the O-RAN FHA SW 390 may provide real-time frame insertion/removal functionality for, e.g., intrusive thru M-Plane peering.

The O-RAN FHA SW 390 may be implemented in and/or by any number of processors and non-transitory computer-readable storage media storing instructions executable by the processor(s) which may be separate from the hardware accelerator which may comprise the O-RAN FHA HW 300. The processor(s) implementing the O-RAN FHA SW 390 may include multiple processing units executing instructions in parallel. The non-transitory computer-readable storage medium/media implementing the O-RAN FHA SW 390 may be any memory, such as a hard disk drive, a removable memory, or a solid-state drive (e.g., flash memory or dynamic random access memory (DRAM)). In some examples, one or more processors in the O-RAN FHA SW 390 may perform one or more functions; in some examples, one or more non-transitory computer-readable storage media in the O-RAN FHA SW 390 may store instructions that, when executed by the one or more processors, cause the one or more processors to perform any of the functions described herein. In some examples, functions such as those described herein in reference to the O-RAN FHA SW 390 may be performed by one or more processors wired/wirelessly connected to the O-RAN FHA HW 300.

In some examples, the O-RAN FHA SW 390 may be implemented by a rack server, such as, for example, a Dell™ PowerEdge Rack Server (e.g., a R7515 server), containing one or more processors, such as, for example, an Advanced Micro Devices (AMD™) EPYC 700x/900x series server processor, with from 8 GB to 2 TB of DDR4 Registered DIMM (RDIMM) and/or Load-Reduced DIMM (LRDIMM) having a bandwidth up to 3200 MegaTransfers per second (MT/s), and 100 GB-1 TB Solid State Drive (SSD) memory. As would be understood by one of ordinary skill in the art, this is only one specific configuration of a wide variety of possible configurations suitable for implementing the O-RAN FHA SW 390.

Returning to the O-RAN FHA HW 300 in FIG. 3, it may be observed from the above description that the O-RAN FHA HW 300 according to examples of the present disclosure may include one or more of the following functions:

- Physical layer/QSFP interfaces, supporting dual port 10/25/100G Ethernet monitors and in-line flow-thru mode, with recovered clock for SyncE transparency.
- Ethernet MAC layer functions, including Layer 2 Link counters/stats (aggregate per port).
- Packet parsing covering Layer 2 thru 4, and basic eCPRI/O-RAN headers
- Flow discovery/tracking in hardware with per connection statistics (flow types include all valid C/U/S/M frames)—which may be used for Explorer style GUI in the O-RAN FHA SW 390.
- Flexible flow filtering to direct specific flows to analysis blocks in hardware (with possible software-controlled parameters for the filtering in the O-RAN FHA SW 390)
- Analysis blocks may include:
  - Hardware C/U Timing/Window Analysis (on downlink and uplink U-plane/C-plane frames)
  - Hardware Packet Capture, supporting dual port 100G line rate capture.
  - Real-time software analysis (by the O-RAN FHA SW 390 receiving data via HW/SW interface 389)
  - Hardware O-RAN Fronthaul PTP and ESMC frames
- O-RAN standard and I/Q Tx/Rx analysis
- Timestamp counter with nanosecond resolution and possible inputs from external timing modules.
- Frame insertion/removal (including, e.g., real-time software frame insertion/removal by the O-RAN FHA SW 390 for intrusive thru M-plane peering).
- Support for low latency flow-thru mode (Layer 1) and low-time-error intrusive mode (Layer 2)
- O-RAN Impairment block(s)

Figure 4:
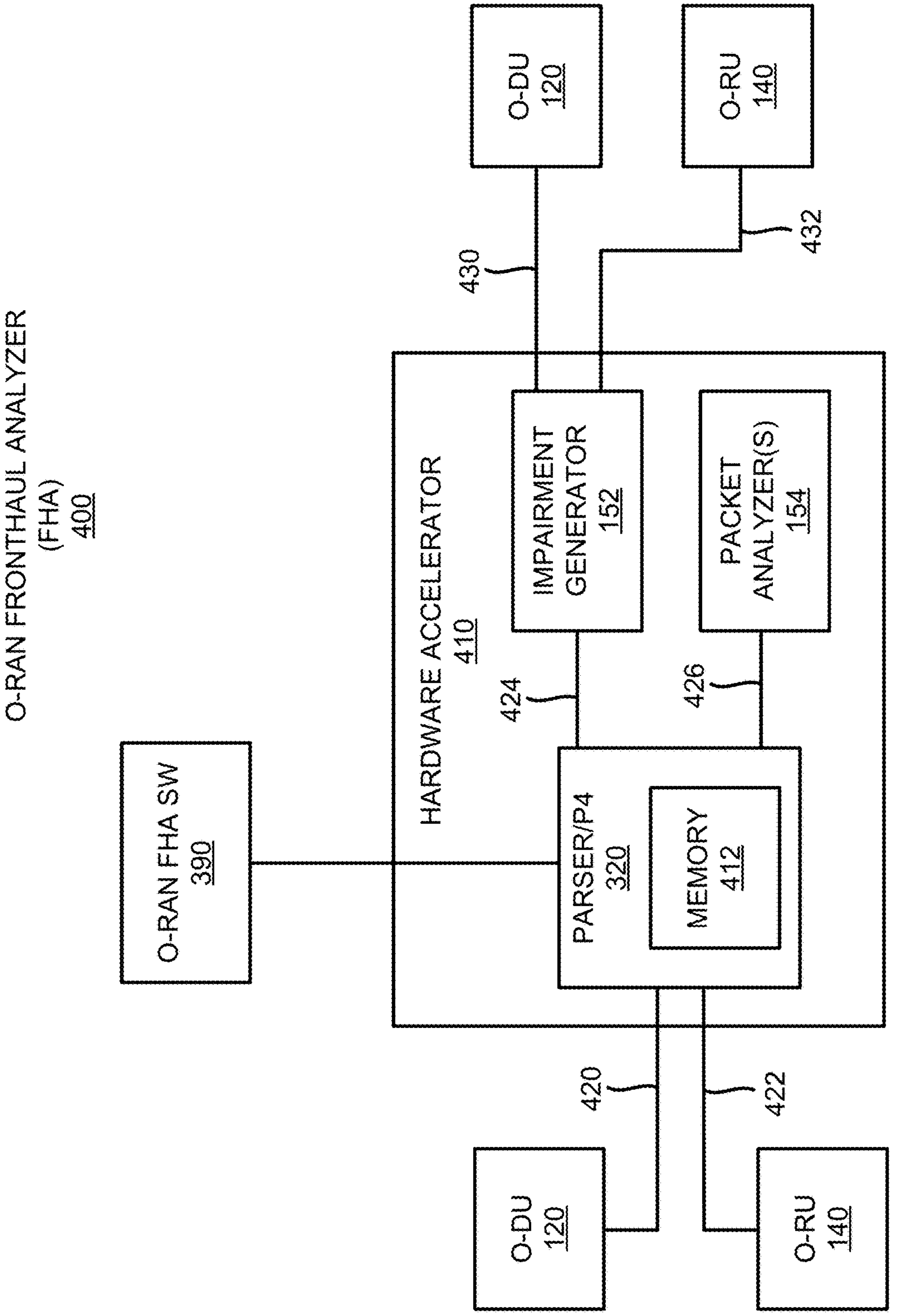
FIG. 4 illustrates a block diagram of an O-RAN fronthaul analyzer having an integrated impairment generator, according to an example.

FIG. 4 illustrates a block diagram of an O-RAN fronthaul analyzer 400 having an integrated impairment generator 152, according to an example. The O-RAN fronthaul analyzer (FHA) 400 may be equivalent to the O-RAN fronthaul analyzer 150 depicted in FIGS. 1 and 3. In this regard, the O-RAN FHA 400 may include similar or the same components as those depicted in FIGS. 1 and 3. The components in FIG. 4 that are similar to those depicted in FIGS. 1 and 3 are labeled with the same reference numerals.

As shown, the O-RAN FHA 400 may include a hardware accelerator 410 (which may also be termed a hardware packet analyzer or a packet analyzer that includes hardware). As discussed herein, the hardware accelerator 410 may be any group of programmable logic blocks with reconfigurable interconnects, such as, a PLD, an FPGA, CLBs, and/or the like. The hardware accelerator 410 may include a Parser (or P4) 320 that may include a memory 412, which may be a TCAM. The hardware accelerator 410 may also include an impairment generator 152 and one or more packet analyzers 154.

According to examples, the Parser/P4 320 may receive packet traffic flows 420, 422 outputted by an O-DU 120 and/or an O-RU 140. Particularly, for instance, the Parser/P4 320 may receive packet traffic flows 420 that include packets that an O-DU 120 has outputted to an O-RU 140. Additionally, or alternatively, the Parser/P4 320 may receive packet traffic flows 422 that include packets that an O-RU 140 has outputted to an O-DU 120. As discussed herein, the Parser/P4 320 may receive the packet traffic flows 420, 422 through connections with the O-DU 120 and the O-RU 140 as shown in FIG. 3. In addition, although a single O-DU 120 and a single O-RU 140 are depicted in FIG. 4, it should be understood that the Parser/P4 320 may receive packet traffic flows outputted by additional O-DUs and/or O-RUs.

According to examples, a user may select which of the packet traffic flows 420, 422 are to receive impairments and the types of impairments (actions) that are to be applied to the selected packet traffic flows 420, 422. The selection of the packet traffic flows 420, 422 and the actions may result in software programming the memory 412 (e.g., TCAM functions) with rules that identify the packet traffic flows 420, 422 and the actions. For instance, the rules may identify the packet traffic flows 420, 422 upon which the actions are to be applied and the action bits may denote the types of impairments to be applied to the identified packet traffic flows 420, 422. By way of particular example, the O-RAN FHA software 390 may configure the memory 412 (TCAM) with the identities, e.g., flow numbers, of the packet traffic flows 420, 422 on which the actions are to be performed and types of actions that are to be performed on the packet traffic flows 420, 422. The actions may also correspond to actions that the packet analyzer(s) 154 are to perform on the packet traffic flows 420, 422.

According to examples, the user may select which of the packet traffic flows 420, 422 are to receive impairments and the types of impairments (actions) that are to be applied to the selected packet traffic flows 420, 422 based on the types of the traffic flows. For instance, whether the packet traffic flows 420, 422 are from an O-DU 120 to an O-RU 140 or from an O-RU 140 to an O-DU 120. In addition or alternatively, the selection may be based on whether packets in the packet traffic flows 420, 422 are Control Plane (C-Plane) packets, User Plane (U-Plane) packets, or Synchronization Plane (S-Plane) packets. In other words, the user may select which of these types of packets certain types of impairments are to be applied.

As discussed herein, the Parser/P4 320 may parse the packets in the received packet traffic flows 420, 422. In addition, the Parser/P4 320 may determine which of the received packet traffic flows 420, 422 are to receive impairments. For instance, the Parser/P4 320 may compare the identities of the packet traffic flows 420, 422 with the information stored in the memory 412 to make this determination. That is, and as discussed herein, the memory 412 may have stored thereon the identities, e.g., flow numbers, of the packet traffic flows 420, 422 that are to receive impairments. The memory 412 may also have stored thereon the impairments, e.g., actions, that are to be performed on certain ones of the packet traffic flows 420, 422.

The Parser/P4 320 may set action bits for the packets in the packet traffic flows 420, 422 that are to receive impairments to enabled. Likewise, the Parser/P4 320 may not set the action bits for the packets in a packet traffic flow 420, 422 that are not to receive an impairment. In addition, the Parser/P4 320 may set the action bits for the packets to denote information indicating types of impairments to be applied to the packets that are to receive impairments. In addition, the Parser/P4 320 may output packet traffic flow 424 with the set action bits to the impairment generator 152. For instance, the Parser/P4 320 may forward the packets with the set action bits to the impairment generator 152 as sidebands.

The Parser/P4 320 may also output packet traffic flow 426 to the packet analyzer(s) 154. The Parser/P4 320 may set action bits on the packets that are to be outputted to the packet analyzer(s) 154, in which the action bits may identify which of the packet flows the packet analyzer(s) 154 are to analyze. The packet traffic flow 426 outputted to the packet analyzer(s) 154 may also include the action bits as sidebands. The packet analyzer(s) 154 may analyze the packets in the packet traffic flow 426 in any of the manners discussed herein. In some examples, the packet analyzer(s) 154 may analyze the packets in parallel with the generation of the impairments by the impairment generator 152.

The impairment generator 152 may generate impairments on the packet traffic flows 424 and may output the packet traffic flows 430, 432 with the impairments applied to the packet traffic flows to an O-DU 120 and/or an O-RU 140. The impairment generator 152 may output the packet traffic flows 430, 432 through the hardware accelerator 410 as discussed herein.

Figure 5:
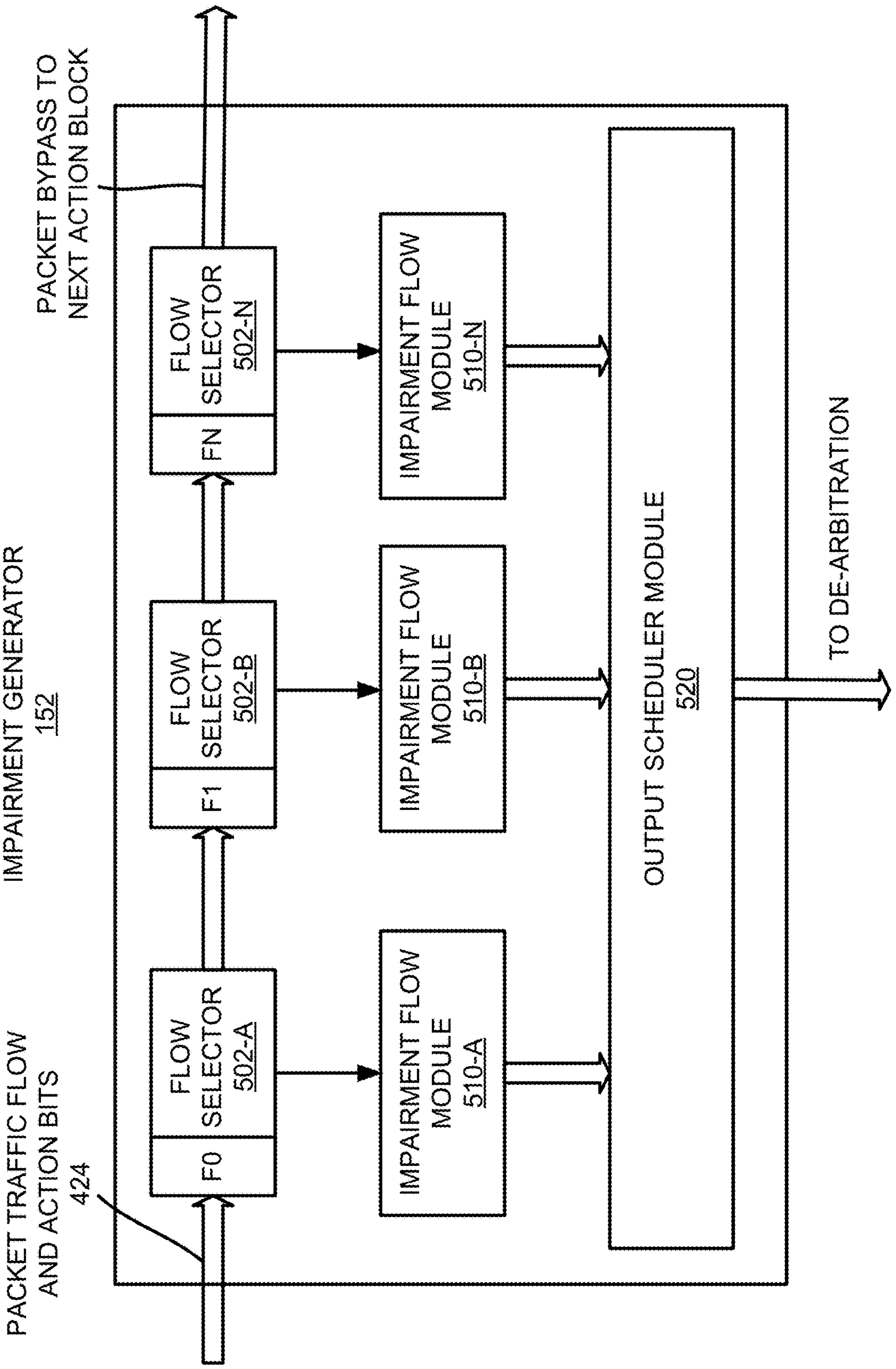
FIG. 5 depicts a block diagram of the impairment generator depicted in FIG. 4, according to an example.

FIG. 5 depicts a block diagram of the impairment generator 152 depicted in FIG. 4, according to an example. As shown in FIG. 5, the impairment generator 152 may include a plurality of flow selectors 502-A to 502-N (or, equivalently, flow selector modules 502-A to 502-N), in which the variable "N" may represent a value greater than one. The impairment generator 152 may also include a plurality of impairment flow modules 510-A to 510-N and an output scheduler module 520.

As shown, packet traffic flows 424 with set action bits may be inputted into the impairment generator 152, e.g., from the Parser/P4 module 320. When inside the impairment generator 152, the packet traffic flows 424 may be inputted into the flow selectors 502-A to 502-N. In some examples, the flow selectors 502-A to 502-N may be instantiated a number of times equal to the number of packet traffic flows 420, 422 selected to receive impairments.

As discussed herein, the action bits for the packets in the packet traffic flows 424 may have the information about the flow number (among the 256 flows) and the sideband of incoming packet traffic flows 424 may have indications of port directions (O-DU 120 to O-RU 140 or O-RU 140 to O-DU 120). Based on this information, the flow selectors 502-A to 502-N check for both the flow number and the impairment corresponding action bits. In addition, the flow selectors 502-A to 502-N take the decision of passing the packet traffic flows 424 through the impairment flow modules 510-A to 510-N or passing it to the next flow selector. Based on the information, the flow selector 510-N may bypass the impairment flow module 510-N and may pass the packet traffic flow 424 to a next action block. If there is no next action block, the current action block may stop passing the packet traffic flow 424, e.g., the output packet traffic flow 424 from the current action block may be dropped.

Figure 6:
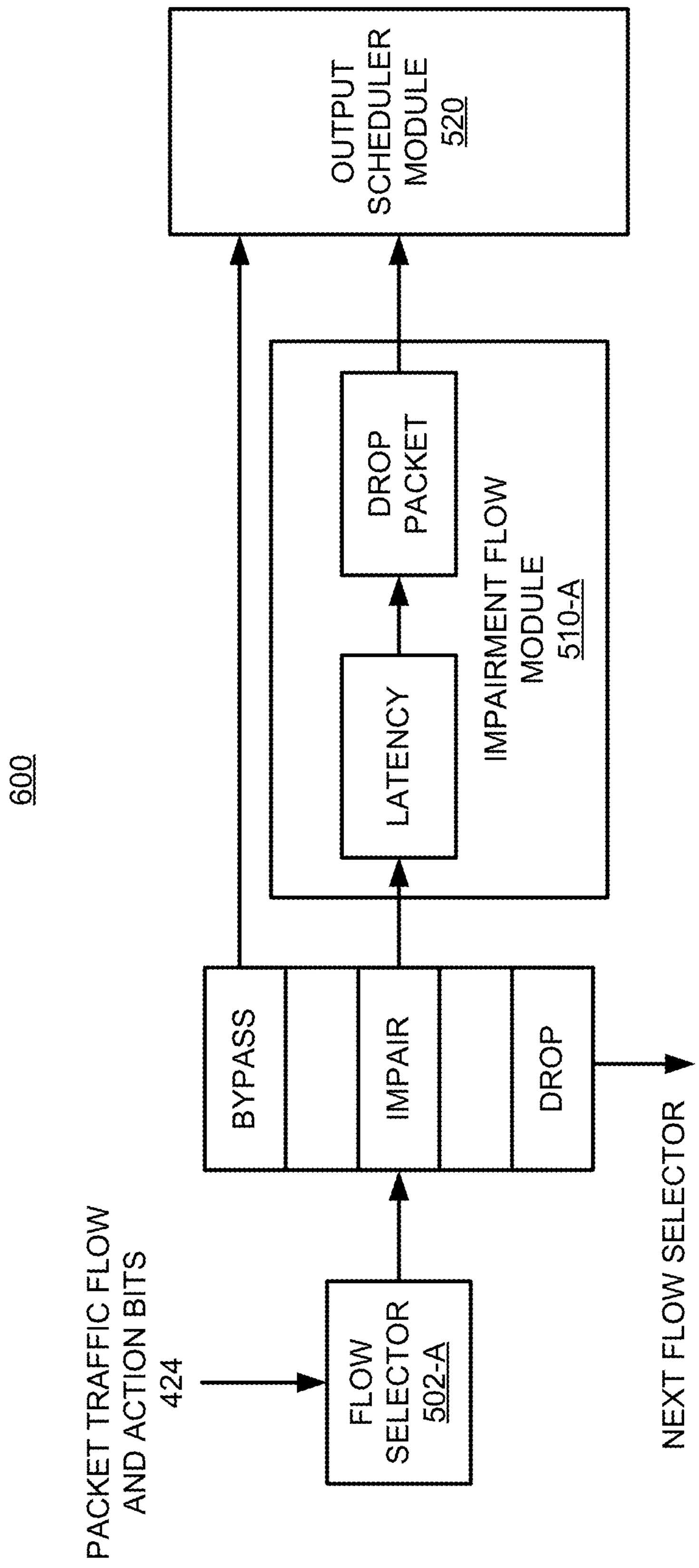
FIG. 6 depicts a block diagram of the impairment generator depicted in FIGS. 4 and 5, according to an example.

FIG. 6 depicts a block diagram of the impairment generator 152 depicted in FIGS. 4 and 5, according to an example. Particularly, the packet traffic flows 424 may be inputted into a first flow selector 502-A, which may check the action bits for the packets in the packet traffic flows 424. Based on settings of the action bits for the packet traffic flows 424, the flow selector 502-A may pass the packet traffic flow 424 to the impairment flow module 510-A such that the impairment flow module 510-A may generate an impairment on the packet traffic flow 424. Alternatively, the flow selector 502-A may pass the packet traffic flow 424 to a next flow selector 502-B or, if the flow selector is the last flow selector, may pass the packet traffic flow 424 to a next action block. As shown in FIG. 6, the flow selection 502-A may pass the packet traffic flow 424 to the output scheduler module 520.

In examples in which the flow selector 502-A finds the corresponding flow configured from software for impairment, the flow selector 502-A passes the packet traffic flow 424 to the impairment flow module 510-A. The impairment flow module 510-A may buffer the incoming packet traffic flow 424 that has been selected for impairment into a memory. In addition, the impairment flow module 510-A may generate a type of impairment on the packets in the packet traffic flow 424. As discussed herein, the action bits for the packets may denote the type of impairment that is to be generated for the packet traffic flow 424. For instance, the impairment flow module 510-A may introduce latency into the delivery of the packets in the packet traffic flow 424 by delaying the output of some of the packets. As another example, the impairment flow module 510-A may drop one or more packets from the packet traffic flow 424, i.e., may prevent the one or more packets from being delivered to their intended destination. As a further example, the impairment flow module 510-A may modify an order in which some of the packets in the packet traffic flow 424 are delivered to their intended destination. The other flow selectors 502-B to 502-N and the other impairment flow modules 510-A to 510-N may operate in similar manners.

The impairment flow module 510-A may also output the packets of the packet traffic flow 424 with the impairment applied to the packets to the output scheduler module 520. The output scheduler module 520 may schedule when packets in the packet traffic flow 424 are to be outputted from the impairment generator 152. Particularly, the output scheduler module 520 may schedule the output of packets in packet traffic flows 424 with impairments added to the packet traffic flows 424 by other impairment flow modules 510-B to 510-N.

According to examples, a first impairment flow module 510-A may generate a first type of impairment, e.g., a latency impairment, on a first packet traffic flow based on information denoted by the action bits for the packets in the first packet traffic flow. In addition, a second impairment flow module 510-B may generate a second type of impairment, e.g., a packet drop, on a second packet traffic flow based on information denoted by the action bits for the packets in the second packet traffic flow.

Figure 7:
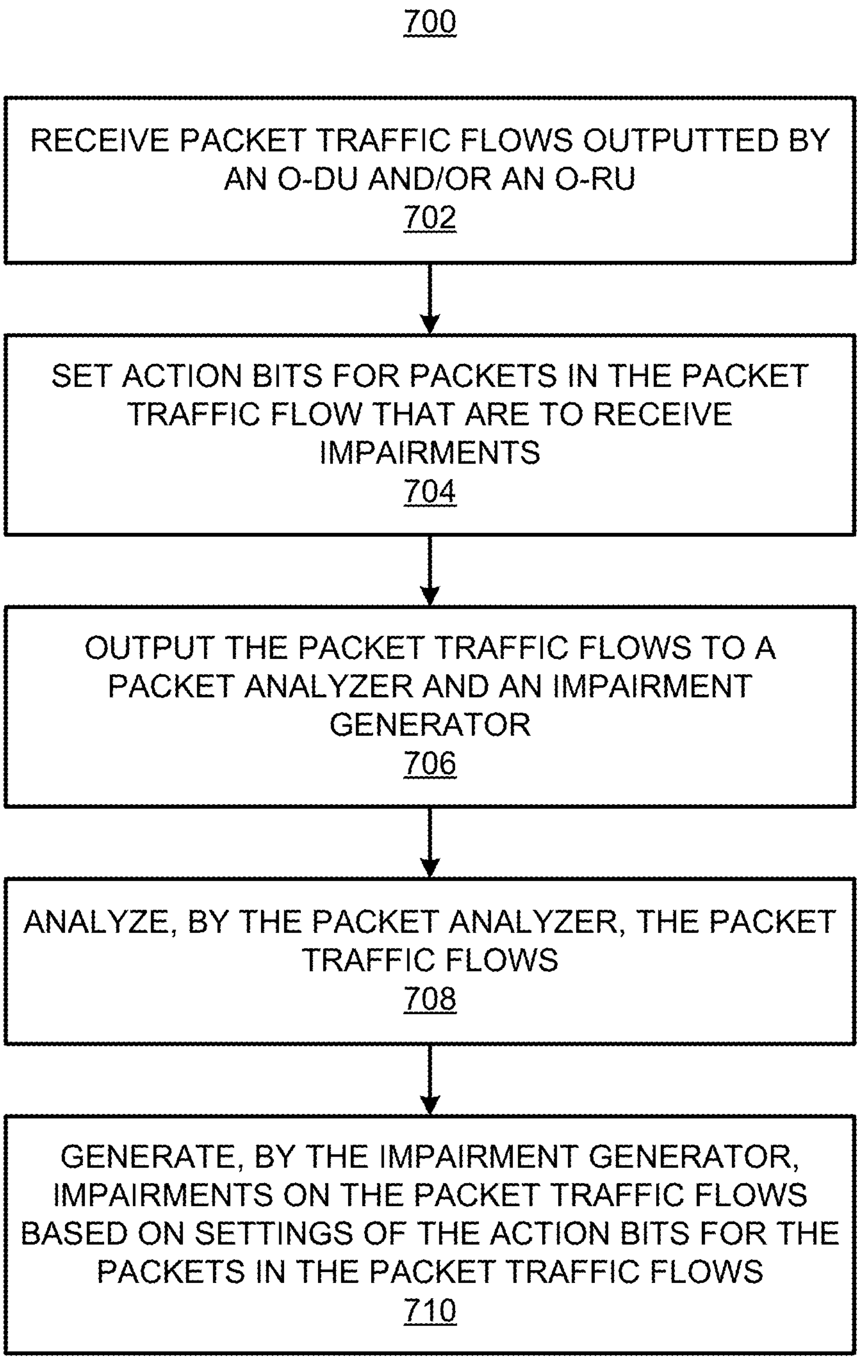
FIG. 7 illustrates a flowchart of a method for generating impairments on packets by an O-RAN FHA having an integrated impairment generator, according to an example.

FIG. 7 illustrates a flowchart of a method 700 for generating impairments on packets by an O-RAN FHA 150, 400 having an integrated impairment generator 152, according to an example. The method 700 shown in FIG. 7 is provided by way of example and may only be one part of an entire process, as would be understood by one of ordinary skill in the art. The method 700 may further omit parts of any process, procedure, ongoing operation, method, etc., involved in O-RAN FH link 130 analysis and/or impairment generation not germane to examples of the present disclosure, as would be understood by one of ordinary skill in the art. Each block shown in FIG. 7 may further represent one or more steps, processes, methods, or subroutines, as would be understood by one of ordinary skill in the art. In some examples, the processes in the blocks of FIG. 7 may overlap and/or may occur substantially simultaneously. For the sake of convenience and ease of explanation, the blocks in FIG. 7 may refer to the components shown in the other figures described herein; however, the method 700 is not limited in any way to the components, apparatuses, and/or constructions described and/or shown in any of the other figures herein.

At block 702, a Programming Protocol-independent Packet Processor (P4) 320 (or, equivalently, a Parser 320), may receive packet traffic flows 420 outputted by an O-DU 120 and/or an O-RU 140. As disclosed herein, a user may have programmed the P4 320 via software to apply impairments on selected ones of the packet traffic flows 420, e.g., by flow number and type of action.

At block 704, the P4 320 may set action bits for packets in the packet traffic flows 420, 422 that are to receive impairments to enabled, in which the action bits denote information indicating types of impairments to be applied to certain ones of the packet traffic flows 420, 422.

At block 706, the P4 320 may output the packet traffic flows 424, 426 with the action bits set for the packets in the packet traffic flows to a packet analyzer 154 and an impairment generator 152.

At block 708, the packet analyzer 154 may analyze the packet traffic flows 426 based on the settings of the action bits for the packets in the packet traffic flows 426.

At block 710, the impairment generator 152 may generate impairments on the packet traffic flows 424 based on settings of the action bits for the packets in the packet traffic flows. As discussed herein, the generation of the impairments on the packet traffic flows 424 may result in the delay in the delivery of some packets in a packet traffic flow 424, a drop of some packets in a packet traffic flow 424, and/or the like.

According to examples, the P4 320 may generate a first type of impairment on a first packet traffic flow based on information denoted by the action bits for the packets in the first packet traffic flow. The P4 320 may also generate a second type of impairment on a second packet traffic flow based on the information denoted in the action bits for the packets in the second packet traffic flow.

While specific circuit configurations such as the arrangements of a number of components are shown in conjunction with the figures herein, the illustrated configurations are not intended to be limiting. A real-time O-RAN FHA 150 in accordance with examples of the present disclosure may be implemented with other configurations and component values using the principles described herein. Moreover, while examples described herein are directed to configurations as shown, it should be appreciated that any of the components described or mentioned herein may be altered, changed, replaced, or modified, in size, shape, and numbers, or material, depending on application or use case, and adjusted for desired analysis or optimal measurement results.

It should be appreciated that the apparatuses, systems, and methods described herein may minimize and/or reduce the timing for performing O-RAN FH link 130 analysis and impairment generation, and thereby facilitate the construction of more reliable and accurate O-RAN FH links 130, specifically by ensuring the interoperability of different components manufactured by different vendors.

It should also be appreciated that the apparatuses, systems, and methods, as described herein, may also include, or communicate with other components not shown. For example, these may include external processors, counters, analyzers, computing devices, and other measuring devices or systems. This may also include middleware (not shown) as well. The middleware may include software hosted by one or more servers or devices. Furthermore, it should be appreciated that some of the middleware or servers may or may not be needed to achieve functionality. Other types of servers, middleware, systems, platforms, and applications not shown may also be provided at the backend to facilitate the features and functionalities of the testing and measurement system.

Moreover, single components may be provided as multiple components, and vice versa, to perform the functions and features described herein. It should be appreciated that the components of the system described herein may operate in partial or full capacity, or it may be removed entirely. It should also be appreciated that analytics and processing techniques described herein with respect to the O-RAN FH link 130, for example, may also be performed partially or in full by other various components of the overall system.

It should be appreciated that data stores may also be provided to the apparatuses, systems, and methods described herein, and may include volatile and/or nonvolatile data storage that may store data and software or firmware including machine-readable instructions. The software or firmware may include subroutines or applications that perform the functions of the measurement system and/or run one or more applications that utilize data from the measurement or other communicatively coupled system.

The various components, circuits, elements, components, and interfaces, may be any number of mechanical, electrical, hardware, network, or software components, circuits, elements, and interfaces that serves to facilitate communication, exchange, and analysis data between any number of or combination of equipment, protocol layers, or applications. For example, the components described herein may each include a network or communication interface to communicate with other servers, devices, components or network elements via a network or other communication protocol.

Generally speaking, any one or more of the components and/or functionalities described in reference to any of the figures herein may be implemented by hardware, software, and/or any combination thereof, as described in the above examples of the present disclosure. In some examples, the components and/or functionalities may be implemented by at least one of any type of application, program, library, script, task, service, process, or any type or form of executable instructions executed on hardware such as circuitry that may include digital and/or analog elements (e.g., one or more transistors, logic gates, registers, memory devices, resistive elements, conductive elements, capacitive elements, and/or the like, as would be understood by one of ordinary skill in the art). In some examples, the hardware and data processing components used to implement the various processes, operations, logic, and circuitry described in connection with the examples described herein may be implemented with a general purpose single—and/or multichip processor, a single—and/or multi-core processor, a digital signal processor (DSP), an application specific integrated circuit (ASIC), a field programmable gate array (FPGA), or other programmable logic device, discrete gate or transistor logic, discrete hardware components, and/or any combination thereof suitable to perform the functions described herein. A general purpose processor may be any conventional processor, microprocessor, controller, microcontroller, and/or state machine. In some examples, the memory/storage may include one or more components (e.g., random access memory (RAM), read-only memory (ROM), flash or solid state memory, hard disk storage, etc.) for storing data and/or computer-executable instructions for completing and/or facilitating the processing and storage functions described herein. In some examples, the memory/storage may be volatile and/or non-volatile memory, and may include database components, object code components, script components, or any other type of information structure suitable for implementing the various activities and storage functions described herein.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. An Open Radio Access Network (O-RAN) fronthaul analyzer, comprising:

a packet analyzer comprising hardware;

an impairment generator; and a Parser to receive packet traffic flows outputted by an O-RAN Distributed Unit (O-DU) and/or an O-RAN Radio Unit (O-RU), wherein the Parser is to:

parse packets in the received packet traffic flows;

determine which of the received packet traffic flows are to receive impairments;

set action bits for the packets in the packet traffic flows that are to receive impairments, wherein the action bits denote information indicating types of impairments to be applied to certain ones of the packet traffic flows; and output the packet traffic flows with the action bits set for the packets to the packet analyzer and the impairment generator, and wherein the impairment generator is to generate:

a first type of impairment on a first packet traffic flow based on information denoted by the action bits for the packets in the first packet traffic flow; and a second type of impairment on a second packet traffic flow based on information denoted by the action bits for the packets in the second packet traffic flow.

2. The O-RAN fronthaul analyzer of claim 1, wherein the impairment generator is further to:

receive the packet traffic flows from the Parser;

determine, from the action bits, which of the packet traffic flows are to receive impairments; and generate impairments on the packet traffic flows that are to receive impairments.

3. The O-RAN fronthaul analyzer of claim 1, wherein the action bits have information regarding flow numbers, an indication of whether the packet traffic flows flow from the O-DU to the O-RU or from the O-RU to the O-DU, and a type of impairment to be applied to the packet traffic flows that are to receive impairments.

4. The O-RAN fronthaul analyzer of claim 3, wherein the impairment generator comprises:

impairment flow modules; and flow selector modules, wherein each of the flow selector modules is to:

check the action bits for the packets in the packet traffic flows; and based on settings of the action bits, pass the packet traffic flows to one of the impairment flow modules;

pass the packet traffic flows to another flow selector module; or pass the packet traffic flows outside of the impairment generator.

5. The O-RAN fronthaul analyzer of claim 4, wherein the impairment flow modules are to apply a certain type of impairment on the packet traffic flows based on information denoted by the action bits.

6. The O-RAN fronthaul analyzer of claim 5, wherein the impairment generator further comprises:

an output scheduler module, wherein the impairment flow modules are to output the packet traffic flows with the impairments applied to the packet traffic flows to the output scheduler module and wherein the output scheduler module is to schedule when packets in the packet traffic flows are to be outputted from the impairment generator.

7. The O-RAN fronthaul analyzer of claim 1, wherein the impairments comprise at least one of a packet traffic flow latency modification, one or more dropped packets in the packet traffic flow, or a modification to an order of the packets in the packet traffic flow.

8. The O-RAN fronthaul analyzer of claim 1, wherein the packet analyzer generates analytical timing measurements in real-time using timestamps of packets in the packet traffic flows.

9. The O-RAN fronthaul analyzer of claim 8, wherein the impairment generator is to generate the impairment in parallel with the generation of the analytical timing measurements generated by the packet analyzer.

10. The O-RAN fronthaul analyzer of claim 1, wherein the Parser is part of a Programming Protocol-independent Packet Processor (P4).

11. The O-RAN fronthaul analyzer of claim 1, wherein the Parser is to determine which of the received packet traffic flows are to receive impairments based on a determination that packets in the packet traffic flows are Control Plane (C-Plane) packets, User Plane (U-Plane) packets, or Synchronization Plane (S-Plane) packets.

12. A hardware accelerator to analyze an Open Radio Access Network (O-RAN) fronthaul link, comprising:

a packet analyzer comprising hardware;

an impairment generator comprising:

impairment flow modules; and flow selector modules; and a Programming Protocol-independent Packet Processor (P4) to receive packet traffic flows outputted by an O-RAN Distributed Unit (O-DU) and/or an O-RAN Radio Unit (O-RU), wherein the P4 is to:

parse packets in the received packet traffic flows;

determine which of the received packet traffic flows are to receive impairments;

set action bits for the packet traffic flows that are to receive impairments, wherein the action bits denote information indicating types of impairments to be applied to packets in certain ones of the received packet traffic flows; and output the packet traffic flows to the packet analyzer and the impairment generator, wherein the packet analyzer is to generate analytical timing measurements in real-time using timestamps of the packets in the packet traffic flows; and wherein each of the flow selector modules of the impairment generator is to:

check the action bits for the packets in the packet traffic flows; and based on settings of the action bits, pass the packet traffic flows to one of the impairment flow modules;

pass the packet traffic flows to another flow selector module; or pass the packet traffic flows outside of the impairment generator; and wherein the impairment flow modules are to apply a first type or a second type of impairment on the packet traffic flows based on settings of the action bits for the packets in the packet traffic flows.

13. The hardware accelerator of claim 12, wherein the impairment generator is further to:

generate a first type of impairment on a first packet traffic flow based on information denoted by the action bits for the packets in the first packet traffic flow; and generate a second type of impairment on a second packet traffic flow based on information denoted by the action bits for the packets in the second packet traffic flow.

14. The hardware accelerator of claim 12, wherein the hardware accelerator is a field programmable gate array.

15. A method of generating impairments on packets, comprising:

receiving, by a Programming Protocol-independent Packet Processor (P4), packet traffic flows outputted by an O-RAN Distributed Unit (O-DU) and/or an O-RAN Radio Unit (O-RU);

parsing, by the P4, packets in the received packet traffic flows;

determining, by the P4, which of the received packet traffic flows are to receive impairments;

setting, by the P4, action bits for packets in the packet traffic flows that are to receive impairments to enabled, wherein the action bits denote information indicating types of impairments to be applied to certain ones of the packet traffic flows;

outputting, by the P4, the packet traffic flows to a packet analyzer and an impairment generator;

analyzing, by the packet analyzer, the packet traffic flows; and generating, by the impairment generator, a first type of impairment on a first packet traffic flow based on information denoted by the action bits for the packets in the first packet traffic flow; and a second type of impairment on a second packet traffic flow based on information denoted by the action bits for the packets in the second packet traffic flow.

16. The method of claim 15, wherein generating impairments on the packet traffic flows further comprises:

receiving, by the impairment generator, the packet traffic flows from the P4;

determining, from the action bits, which of the packet traffic flows are to receive impairments; and generating the first type and the second type of impairments on the packet traffic flows that are to receive impairments according to information contained in the action bits.

* * * * *